US010044795B2

(12) United States Patent
Reddy et al.

(10) Patent No.: US 10,044,795 B2
(45) Date of Patent: Aug. 7, 2018

(54) METHODS AND APPARATUS FOR RACK DEPLOYMENTS FOR VIRTUAL COMPUTING ENVIRONMENTS

(71) Applicant: VMware, Inc., Palo Alto, CA (US)

(72) Inventors: Thirumalesh Reddy, San Jose, CA (US); Raj Yavatkar, Saratoga, CA (US); Sreekantha Indireddy, Cupertino, CA (US); Shreekanth Ankala, Dublin, CA (US)

(73) Assignee: VMWARE INC., Palo Alto, CA (US)

( * ) Notice: Subject to any disclaimer, the term of this patent is extended or adjusted under 35 U.S.C. 154(b) by 393 days.

(21) Appl. No.: 14/752,699

(22) Filed: Jun. 26, 2015

(65) Prior Publication Data

US 2016/0013974 A1    Jan. 14, 2016

Related U.S. Application Data

(60) Provisional application No. 62/023,813, filed on Jul. 11, 2014.

(51) Int. Cl.
*H04L 29/08*  (2006.01)
*G06F 9/455*  (2018.01)
(Continued)

(52) U.S. Cl.
CPC ............ *H04L 67/10* (2013.01); *G06F 9/4416* (2013.01); *G06F 9/45558* (2013.01);
(Continued)

(58) Field of Classification Search
CPC .. G06F 9/45558; G06F 9/4416; G06F 9/5077; G06F 2009/45595
See application file for complete search history.

(56) References Cited

U.S. PATENT DOCUMENTS 7,389,300 B1     6/2008  Shah et al.
7,574,491 B2 *   8/2009  Stein .................. H04L 41/0806
                                                          709/217
(Continued)

FOREIGN PATENT DOCUMENTS

EP          1521172          4/2005

OTHER PUBLICATIONS

United States Patent and Trademark Office, "Non-Final Office Action," issued in connection with U.S. Appl. No. 14/796,803, filed Feb. 22, 2017, 42 pages.

(Continued)

*Primary Examiner* — Azizul Choudhury
(74) *Attorney, Agent, or Firm* — Hanley, Flight & Zimmerman, LLC

(57) ABSTRACT

Methods and apparatus for rack deployments for virtual computing environments are disclosed. An example method includes retrieving, from a repository remote from a system integrator, a software image to be deployed on a processing unit installed in a server rack, in response to receiving a dynamic host configuration protocol request from a processing unit at a virtual imaging appliance, detecting the processing unit and transmitting a network address to the processing unit to be utilized by the processing unit, transmitting the software image from the virtual imaging appliance to the network address assigned to the processing unit, and transmitting a hardware management system software image from the virtual imaging appliance to a network switch installed in the server rack to cause a hardware management system to be installed in the server rack.

20 Claims, 15 Drawing Sheets

(51) Int. Cl.

| | | |
|---|---|---|
| *H04L 12/46* | (2006.01) | |
| *H04L 12/24* | (2006.01) | |
| *G06F 9/4401* | (2018.01) | |
| *H04L 29/06* | (2006.01) | |
| *G06F 9/50* | (2006.01) | |
| *H04L 29/12* | (2006.01) | |
| *H04L 12/26* | (2006.01) | |

(52) U.S. Cl.
CPC ........ *G06F 9/5077* (2013.01); *H04L 12/4675* (2013.01); *H04L 41/048* (2013.01); *H04L 41/0806* (2013.01); *H04L 41/0893* (2013.01); *H04L 41/5096* (2013.01); *H04L 67/38* (2013.01); *G06F 2009/45595* (2013.01); *H04L 41/0266* (2013.01); *H04L 41/0681* (2013.01); *H04L 41/082* (2013.01); *H04L 41/5038* (2013.01); *H04L 43/0817* (2013.01); *H04L 43/0852* (2013.01); *H04L 43/0876* (2013.01); *H04L 43/10* (2013.01); *H04L 61/2015* (2013.01); *H04L 61/2076* (2013.01)

(56) References Cited

U.S. PATENT DOCUMENTS

| | | | |
|---|---|---|---|
| 8,689,054 | B1 | 4/2014 | van der Goot |
| 8,997,098 | B2 | 3/2015 | Lee et al. |
| 9,176,764 | B1 | 11/2015 | Jorgensen |
| 2001/0029605 | A1 | 10/2001 | Forbes et al. |
| 2003/0204603 | A1* | 10/2003 | Buchanan ............... H04L 29/06 709/228 |
| 2004/0187103 | A1 | 9/2004 | Wickham et al. |
| 2005/0027843 | A1 | 2/2005 | Bozak et al. |
| 2005/0044220 | A1 | 2/2005 | Madhavan |
| 2006/0156041 | A1 | 7/2006 | Zaretsky et al. |
| 2006/0184349 | A1 | 8/2006 | Goud et al. |
| 2007/0027973 | A1 | 2/2007 | Stein et al. |
| 2008/0201705 | A1 | 8/2008 | Wookey |
| 2009/0249284 | A1 | 10/2009 | Antosz et al. |
| 2009/0249354 | A1 | 10/2009 | Yamaguchi et al. |
| 2009/0290501 | A1 | 11/2009 | Levy et al. |
| 2009/0328030 | A1 | 12/2009 | Fries |
| 2010/0042723 | A1 | 2/2010 | Sundarrajan et al. |
| 2010/0070784 | A1 | 3/2010 | Gupta et al. |
| 2010/0106813 | A1 | 4/2010 | Voutilainen et al. |
| 2010/0114826 | A1 | 5/2010 | Voutilainen et al. |
| 2010/0235688 | A1 | 9/2010 | Bennah et al. |
| 2011/0029669 | A1 | 2/2011 | Chuang et al. |
| 2011/0153697 | A1* | 6/2011 | Nickolov ............... G06F 9/4856 707/827 |
| 2012/0166390 | A1 | 6/2012 | Merriman et al. |
| 2012/0179466 | A1 | 7/2012 | Huang et al. |
| 2012/0249588 | A1 | 10/2012 | Tison et al. |
| 2012/0266166 | A1 | 10/2012 | Farkas et al. |
| 2012/0303767 | A1 | 11/2012 | Renzin |
| 2014/0075179 | A1 | 3/2014 | Krishnapura et al. |
| 2014/0082202 | A1 | 3/2014 | Zhao |
| 2014/0129699 | A1 | 5/2014 | Jeftovic et al. |
| 2014/0156850 | A1 | 6/2014 | Hunt |
| 2014/0173580 | A1 | 6/2014 | McDonald et al. |
| 2014/0181294 | A1 | 6/2014 | Deshpande et al. |
| 2014/0280975 | A1 | 9/2014 | Mordani et al. |
| 2014/0282519 | A1 | 9/2014 | Apte et al. |
| 2014/0282520 | A1 | 9/2014 | Sabharwal |
| 2014/0297834 | A1* | 10/2014 | Tripathi ............... G06F 8/63 709/224 |
| 2014/0351809 | A1 | 11/2014 | Chawla et al. |
| 2014/0380308 | A1 | 12/2014 | Hassine et al. |
| 2015/0046572 | A1 | 2/2015 | Cheng et al. |
| 2015/0089496 | A1 | 3/2015 | Thankappan et al. |
| 2015/0113529 | A1 | 4/2015 | Zhong |
| 2015/0143382 | A1 | 5/2015 | Chen et al. |
| 2015/0149620 | A1 | 5/2015 | Banerjee et al. |
| 2015/0154056 | A1 | 6/2015 | Chen et al. |
| 2015/0207752 | A1 | 7/2015 | Birkestrand et al. |
| 2015/0261578 | A1 | 9/2015 | Greden et al. |
| 2015/0286935 | A1 | 10/2015 | Mukherjee et al. |
| 2016/0004696 | A1 | 1/2016 | Trenkov et al. |
| 2016/0283221 | A1 | 9/2016 | Kochar et al. |
| 2016/0371105 | A1 | 12/2016 | Sieffert et al. |

OTHER PUBLICATIONS

Pham et al., "An Evaluation of ZooKeeper for High Availability in System S," ICPE '14, Mar. 22, 2014, 11 pages.

United States Patent and Trademark Office, "Non-Final Office Action," issued in connection with U.S. Appl. No. 14/788,004, dated Jun. 5, 2017, 32 pages.

United States Patent and Trademark Office, "Final Office Action," issued in connection with U.S. Appl. No. 14/796,803, dated May 22, 2017, 22 pages.

Vmware Infrastructure, "Resource Management with VMware DRS," copyright 1998-2006, VMware Inc., Palo Alto, California, 24 pages. (The latest year of publication is sufficiently earlier than the effective U.S. filing date so that the particular month of publication is not in issue.).

United States Patent and Trademark Office, "Non-Final Office Action," issued in connection with U.S. Appl. No. 14/788,210, dated Jun. 30, 2015, 54 pages.

virtualRACK, An Inter Pole Enterprise, copyright 2009, http://www.virtualrack.in/, 1 page. (The year of publication is sufficiently earlier than the effective U.S. filing date so that the particular month of publication is not in issue.).

virtualRACK, "VirtualRack Overview," An Inter Pole Enterprise, copyright 2009, http://www.virtualrack.in/overview.php, 1 page. (The year of publication is sufficiently earlier than the effective U.S. filing date so that the particular month of publication is not in issue.).

virtualRACK, "Questions," An Inter Pole Enterprise, copyright 2009, http://www.virtualrack.in/questions.php, 3 pages. (The year of publication is sufficiently earlier than the effective U.S. filing date so that the particular month of publication is not in issue.).

virtualRACK, "Why VirtualRack?," An Inter Pole Enterprise, copyright 2009, http://www.virtualrack.in/why-virtualrack.php, 2 pages. (The year of publication is sufficiently earlier than the effective U.S. filing date so that the particular month of publication is not in issue.).

Vmware, "Using the CIM Object Space," http://pubs.vmware.com/vsphere-55/index.jsp?topic=%2Fcom.vmware.cimsdk.smashpg.doc%2F03_CIM_SMASH_PG_Use_Cases.5.1.html, retrieved on Aug. 31, 2016, 1 page.

CISCO, "Proven Savings in IT Operations," http://www.cisco.com/c/en/us/products/servers-unified-computing/ucs-manager/index.html, retrieved on Aug. 31, 2016, 2 pages.

CISCO, "Servers—Unified Computing," http://www.cisco.com/c/en/us/products/servers-unitied-computing/index.html, retrieved on Aug. 31, 2016, 3 pages.

CISCO, "Cisco UCS Faults and Error Messages Reference," http://www.cisco.com/c/en/us/td/docs/unified_computing/ucs/ts/faults/reference/ErrMess/UCS_SEMs.html, retrieved on Aug. 31, 2016, 125 pages.

CISCO, "Cisco UCS Manager Troubleshooting Reference Guide," Chapter: Troubleshooting Server Hardware Issues, http://www.cisco.com/c/en/us/td/docs/unified_computing/ucs/ts/guide/UGSTroubleshooting/UCSTroubleshooting_chapter_0111.html, retrieved on Aug. 31, 2016, 20 pages.

CISCO, "Cisco UCS C-Series Servers Integrated Management Controller CLI Configuration Guide, Release 1.3," http://www.cisco.com/c/en/us/td/docs/unified_computing/ucs/c/sw/cli/config/guide/131/b_Cisco_UCS_C-Series_CLI_Configuration_Guide_131.pdf, Mar. 11, 2011, 150 pages.

INTEL, "IPMI, Intelligent Platform Management Interface Specification Second Generation V2.0," Feb. 12, 2004, http://www.intel.com/CONTENT/WWW/US/EN/SERVERS/IPMI/SECOND-GEN-INTERFACE-SPEC-V2-REV1-4.HTML, 590 pages.

(56) References Cited

OTHER PUBLICATIONS

The International Searching Authority, "Invitation to Pay Additional Fees," issued in connection with application No. PCT/US2016/040205, dated Oct. 20, 2016, 6 pages.

The International Searching Authority, "International Search Report and Written Opinion," issued in connection with application No. PCT/US2016/040205, dated Dec. 15, 2016, 19 pages.

United States Patent and Trademark Office, "Non-Final Office Action," issued in connection with U.S. Appl. No. 15/187,452, dated Aug. 30, 2017, 30 pages.

United States Patent and Trademark Office, "Non-Final Office Action," issued in connection with U.S. Appl. No. 14/796,826 dated Oct. 13, 2017, 46 pages.

United States Patent and Trademark Office, "Non-Final Office Action," issued in connection with U.S. Appl. No. 14/788,193 dated Sep. 25, 2017, 38 pages.

United States Patent and Trademark Office, "Notice of Allowance," issued in connection with U.S. Appl. No. 14/796,803 dated Sep. 12, 2017, 45 pages.

United States Patent and Trademark Office, "Non-Final Office Action," issued in connection with U.S. Appl. No. 15/187,480, dated Nov. 8, 2017, 58 pages.

United States Patent and Trademark Office, "Final Office Action," issued in connection with U.S. Appl. No. 15/187,452, dated Apr. 4, 2018, 19 pages.

United States Patent and Trademark Office, "Notice of Allowance," issued in connection with U.S. Appl. No. 14/788,004, dated Apr. 9, 2018, 8 pages.

United States Patent and Trademark Office, "Notice of Allowance," issued in connection with U.S. Appl. No. 14/796,826, dated May 15, 2018, 15 pages.

* cited by examiner

FIG. 15

METHODS AND APPARATUS FOR RACK DEPLOYMENTS FOR VIRTUAL COMPUTING ENVIRONMENTS

RELATED APPLICATIONS

This patent claims the benefit of U.S. Provisional Patent Application Ser. No. 62/023,813, filed Jul. 11, 2014, entitled "VIRTUAL RACK DEPLOYMENTS FOR VIRTUAL COMPUTING ENVIRONMENTS." U.S. Provisional Patent Application Ser. No. 62/023,813 is hereby incorporated by reference herein in its entirety.

FIELD OF THE DISCLOSURE

The present disclosure relates generally to cloud computing and, more particularly, to deploying virtual server racks for use in virtual computing environments.

BACKGROUND

Virtualizing computer systems provides benefits such as the ability to execute multiple computer systems on a single hardware computer, replicating computer systems, moving computer systems among multiple hardware computers, and so forth. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIGS. 10-15 illustrate example user interfaces that may be presented by the example user interface controller of FIG. 7.

DETAILED DESCRIPTION

Cloud computing is based on the deployment of many physical resources across a network, virtualizing the physical resources into virtual resources, and provisioning the virtual resources for use across cloud computing services and applications. When starting up a cloud computing environment or adding resources to an already established cloud computing environment, data center operators struggle to offer cost-effective services while making resources of the infrastructure (e.g., storage hardware, computing hardware, and networking hardware) work together to achieve pain-free installation/operation and optimizing the resources for improved performance. Prior techniques for establishing and maintaining data centers to provide cloud computing services often lock a data center into a single source for hardware resources because of the need to use customized virtualization software specifically designed for a particular type of hardware. Examples disclosed herein enable establishing and maintaining data centers using virtualization software that is vendor-agnostic. In this manner, data center operators are provided with the flexibility of selecting from any of a number of hardware manufacturers to meet the physical hardware needs of data centers while making it relatively easy for the data center operators to initialize, virtualize and provision new resources. That is, data center operators may use examples disclosed herein to source hardware resources from any of a number of manufacturers without requiring the data center operators to undertake the burdens of developing new software to initialize, virtualize, and provision such resources.

Figure 1:
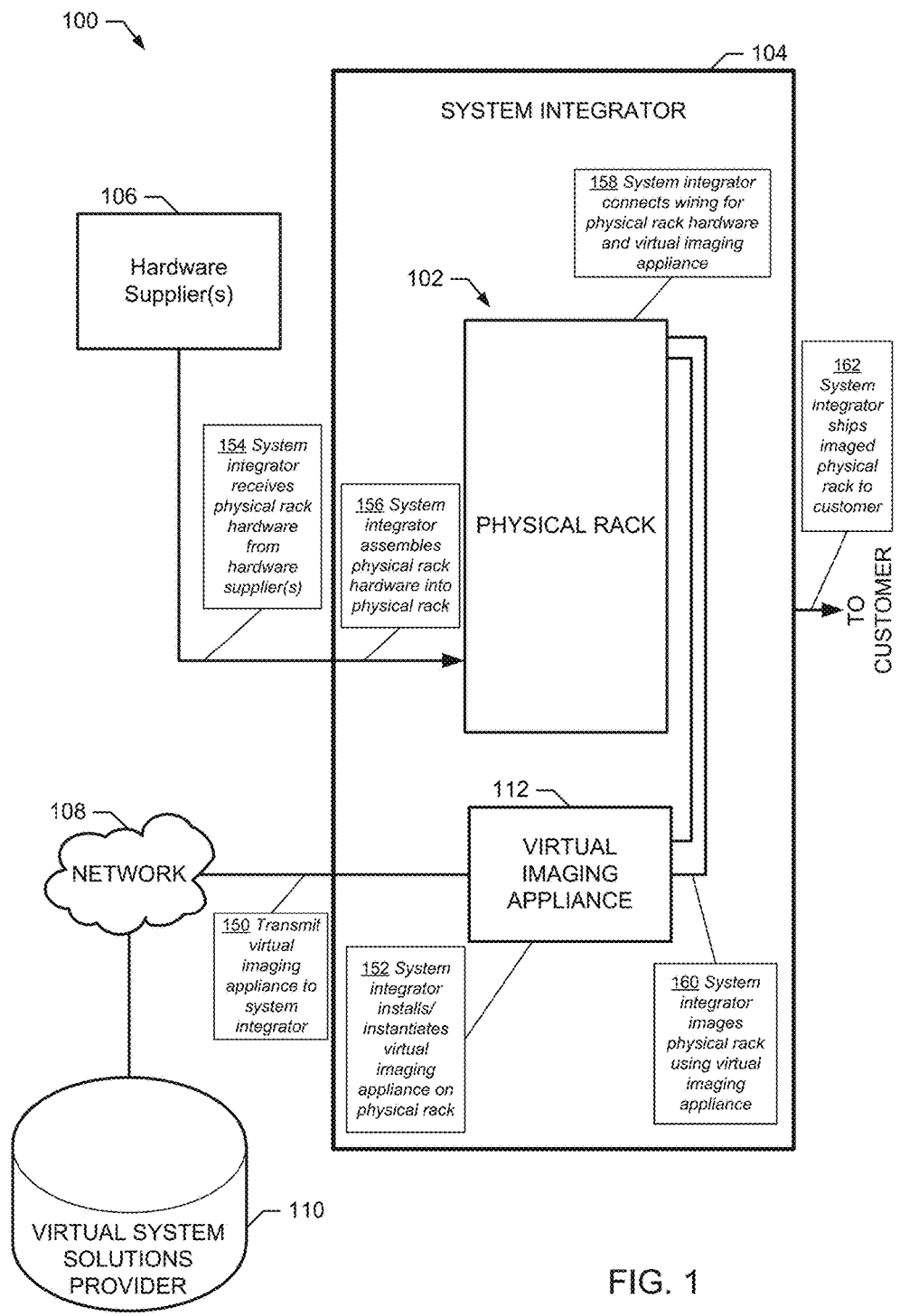
FIG. 1 depicts an example system showing components of an example physical rack deployment disclosed herein.

FIG. 1 depicts an example environment 100 in which a physical rack 102 is prepared by an example system integrator 104 for distribution to a customer. The example environment 100 includes the example physical rack 102, an example system integrator 104, an example hardware supplier(s) 106, an example network 108, an example virtual system solutions provider 110, and an example virtual imaging appliance 112.

The system integrator 104 of the illustrated example receives and fulfills customer orders for computing hardware. The system integrator 104 of the example of FIG. 1 obtains computer hardware and/or software from other suppliers, such as the example hardware supplier(s) 106, and assembles individual hardware components and/or software into functional computing units to fulfill customer orders. Alternatively, the system integrator 104 may design and/or build some or all of the hardware components and/or software to be used in assembling computing units. According to the illustrated example, the system integrator 104 prepares computing units for other entities (e.g., businesses and/or persons do not own and are not owned by the system integrator 104). Alternatively, the system integrator 104 may assemble computing units for use by the same entity as the system integrator 104 (e.g., the system integrator 104 may be a department of a company, wherein the company orders and/or utilizes the assembled computing units). As used herein, the term customer refers to any person and/or entity that receives and/or operates the computing units supplied by the system integrator 104. In some examples, the system integrator 104 is an entity independent of equipment manufacturers such as white-label equipment manufacturers that provide hardware without branding. In other examples, the system integrator 104 is an original equipment manufacturer (OEM) partner that partners with OEMs (e.g., non-white label equipment manufacturers) that provide brand-labeled hardware. Example OEM hardware includes OEM Servers such as Hewlett-Packard® (HP) servers and Lenovo® servers, and OEM Switches such as Arista switches, and/or any other OEM server, switches, or equipment that are labeled by the original manufacturers.

According to the illustrated example, one type of computing unit ordered from and/or assembled by the example system integrator 104 is the physical rack 102. The physical rack 102 is a combination of computing hardware and installed software that may be utilized by a customer to create and/or add to a virtual computing environment. For example, the physical rack 102 may include processing units (e.g., multiple blade servers), network switches to interconnect the processing units and to connect the physical rack 102 with other computing units (e.g., other ones of the physical rack 102 in a network environment such as a cloud computing environment), and/or data storage units (e.g., network attached storage, storage area network hardware, etc.). The physical rack 102 of the illustrated example is prepared by the system integrator 104 in a partially configured state to enable the computing devices to be rapidly deployed at a customer location (e.g., in less than 2 hours). For example, the system integrator 104 may install operating systems, drivers, operations software, management software, etc. The installed components may be configured with some system details (e.g., system details to facilitate intercommunication between the components of the physical rack 102) and/or may be prepared with software to collect further information from the customer when the physical rack 102 is installed and first powered on by the customer.

To facilitate preparation of the physical rack 102 for distribution to a customer, the example system integrator 104 utilizes the virtual imaging appliance 112 to prepare and configure the operating systems, system configurations, software, etc. on the physical rack 102 prior to shipping the example server rack 102 to the customer. The virtual imaging appliance 112 of the illustrated example is a virtual computing appliance provided to the system integrator 104 by the example virtual system solutions provider 110 via the example network 108. The example virtual imaging appliance 112 is executed by the example system integrator 104 in a virtual computing environment of the system integrator 104. For example, the virtual imaging appliance 112 may be a virtual computing image, a virtual application, a container virtual machine image, a software application installed in an operating system of a computing unit of the system integrator 104, etc. The virtual imaging appliance 112 may alternatively be provided by any other entity and/or may be a physical computing device, may be multiple physical computing devices, and/or may be any combination of virtual and physical computing components.

The virtual imaging appliance 112 of the illustrated example retrieves software images and configuration data from the virtual systems solutions provider 110 via the network 108 for installation on the physical rack 102 during preparation of the physical rack 102. The virtual imaging appliance 112 of the illustrated example pushes (e.g., transmits, sends, etc.) the software images and configuration data to the components of the physical rack 102. For example, the virtual imaging appliance 112 of the illustrated example includes multiple network connections (e.g., virtual network connections, physical network connects, and/or any combination of virtual and network connections). For example, the virtual imaging appliance 112 of the illustrated examples connects to a management interface of a network switch(es) installed in the physical rack 102, installs network configuration information on the network switch(es), and reboots the switch(es) to load the installed configuration to communicatively couple the virtual imaging appliance 112 with the computing unit(s) communicatively coupled via the network switch(es). The example virtual imaging appliance 112 also connects to a management network interface (e.g., an out of band interface) of a server(s) installed in the example physical rack 102 to cause an operating system(s) to be installed (e.g., utilizing a preboot execution environment (PXE) boot of an operating system installer). The example virtual imaging appliance 112 also installs virtual environment management components (described in further detail in conjunction with FIGS. 3-6 and in the following pages) and causes the virtual environment management components to boot so that they can take over the deployment of the example server rack 102.

The example virtual imaging appliance 112 is configured to perform many operations of the deployment without user intervention and without the need for a user of the example system integrator 104 to manually connect to the various interfaces of the components of the example physical rack 102. Furthermore, the user of the example virtual imaging appliance 112 is freed from the burden of locating the various software images that may be needed to configure the example physical rack 102 (e.g., firmware images for the network switch(es), operating system images for the server(s), operating system driver(s) for hardware components installed in the physical rack 102, etc.). Additionally, the virtual environment management components deployed by the example virtual imaging appliance 112 are configured by the virtual imaging appliance 112 to facilitate easy deployment of the physical rack 102 at the customer location. For example, the virtual management components installed on the physical rack 102 by the example virtual imaging appliance 112 include graphical user interfaces that guide a customer through the process of inputting configuration parameters (e.g., details of the customer's network, information about existing virtual environments, etc.). In addition, the example virtual management components automatically discover some information about the customer's system (e.g., automatically discover information about existing virtual environments). An example implementation of the virtual imaging appliance 112 is described in conjunction with FIGS. 7-9.

The network 108 of the illustrated example communicatively couples the example system integrator 104 with the virtual system solutions provider 110. According to the illustrated example, the network 108 is the Internet. Alternatively, the network 108 may be any type of local network, wide area network, wireless network, wired network, any combination of networks, etc.

The virtual system solutions provider 110 of the illustrated example is a business that distributes (e.g., sells) the example virtual imaging appliance 112. The virtual system solutions provider 110 of the illustrated example also provides a repository of images and/or other types of software (e.g., virtual machine images, drivers, operations system, etc.) that may be retrieved by the virtual imaging appliance 112 and installed on the physical rack 102. The virtual system solutions provider 110 may alternatively be implemented by multiple entities (e.g., from a manufacturer(s) of the software) and/or any other type of entity.

An example operation process utilized by the example system integrator 104 is illustrated by blocks 150-162 of FIG. 1. The example process begins when the example virtual system solutions provider 110 transmits the virtual imaging appliance 112 to the example system integrator 104 via the example network 108 (block 150). According to the illustrated example, the virtual imaging appliance 112 is a system image that is transmitted to the system integrator 104 to be implemented on computing hardware provided by the system integrator 104. Alternatively, the virtual imaging appliance 112 may be computing hardware and software that is assembled by the virtual system solutions provider 110 and shipped or otherwise delivered to the system integrator 104.

The example system integrator 104 installs and/or instantiates the virtual imaging appliance on computing resources (block 152). For example, the virtual imaging appliance 112 may be a virtual machine image that is installed in a virtual machine environment (e.g., a VMware® virtual machine disk, an open virtualization format (OVF) image, etc.).

The example system integrator 104 then receives physical rack hardware for assembling the physical rack 102 from the example hardware supplier(s) 106 (block 154). While, according to the illustrated example, the example system integrator 104 receives the physical rack hardware after receiving and installing the virtual imaging appliance 112, the system integrator 104 may alternatively receive the physical rack hardware at any other time (e.g., prior to receive and/or installing the virtual imaging appliance 112).

After receiving the physical rack hardware from the example hardware supplier(s) 106, the example system integrator 104 assembles the physical rack hardware into a physical server rack (block 156). Alternatively, the physical rack hardware may not be assembled into a server rack (e.g., the physical rack hardware could be assembled in another type of computing hardware such as a computer case and/or may be computing hardware that will be communicatively coupled but not installed in a rack). The example system integrator 104 then connects wiring for the physical rack 102 to communicatively couple the components of the physical rack 102 and to communicatively couple the physical rack 102 to the example virtual imaging appliance 112 (block 158). According to the illustrated example, the virtual imaging appliance 112 is connected directly to the components of the physical rack 102 (e.g., connected to one or more of a management switch, a top of the rack switch, a processing unit, etc. installed in the example physical rack 102).

Alternatively, the virtual imaging appliance 112 may be connected to the physical rack 102 via intermediate networking components. For example, the virtual imaging appliance 112 may be connected to the physical rack 102 via one or more network switches (e.g., in addition to network switches installed in the physical rack 102). In such an example, the virtual imaging appliance 112 may be communicatively coupled to a plurality of physical racks (e.g., physical racks like the example physical rack 102 that have been assembled by the example system integrator 104 and are ready to be deployed). Accordingly, in such an example a plurality of physical racks may be simultaneously or substantially simultaneously deployed. In such an example, a large number of physical racks may be provisioned for deployment in a rapid manner.

In some examples, the virtual imaging appliance 112 may be coupled with a remotely located physical rack. For example, the virtual imaging appliance 112 may be coupled to the example physical rack 102 via a wide area network, via a network that is not directly routable by the virtual imaging appliance 112, etc. For example, the virtual imaging appliance 112 may utilize a virtual private networking (VPN) connection to facilitate communication with the example physical rack 102. Accordingly, the physical rack 102 may be configured/deployed when it is located remotely from a location at which the example virtual imaging appliance 112 is operated. Thus, the virtual imaging appliance 112 may be utilized to configure physical racks that are located proximate the virtual imaging appliance 112 and physical racks that are located at remote locations.

Figure 7:
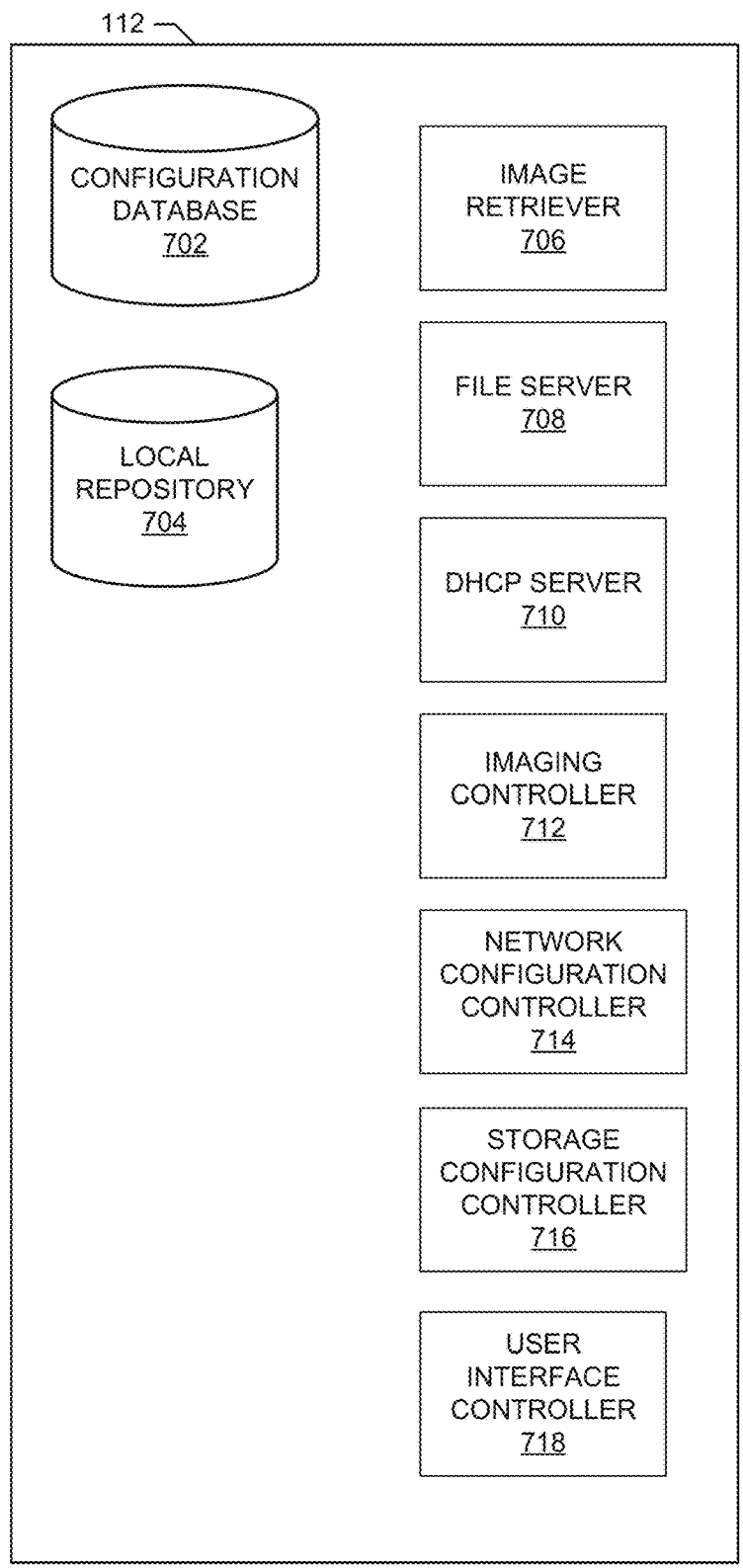
FIG. 7 is a block diagram of an example implementation of the virtual imaging appliance of FIGS. 1 and/or 4.
Figure 8:
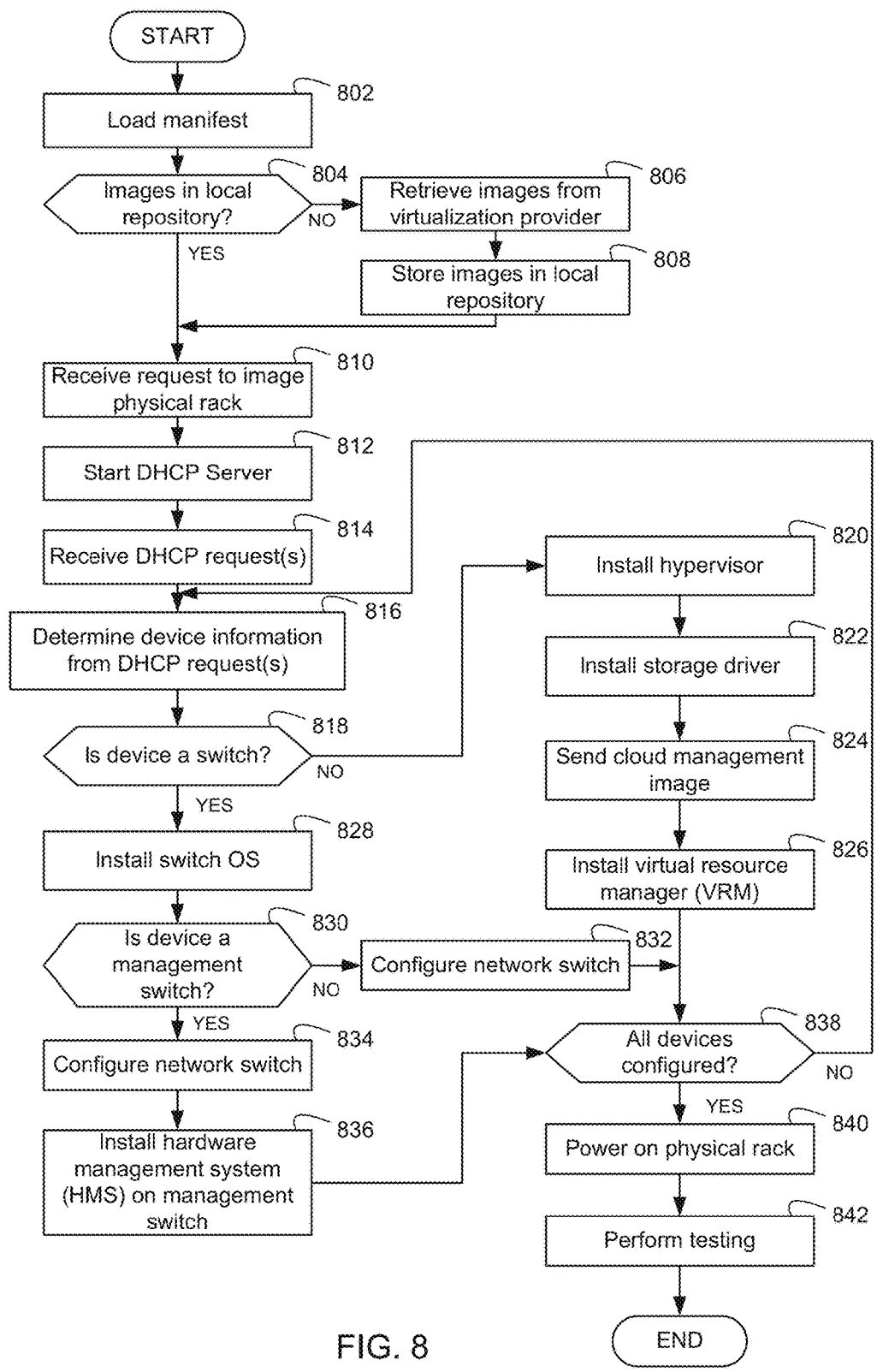
FIG. 8 is a flowchart representative of example machine readable instructions that may be executed to implement the example virtual imaging appliance of FIGS. 1 and/or 4 to image the physical rack of FIGS. 1 and/or 2 to be deployed as part of a virtual server rack deployment.
Figure 9:
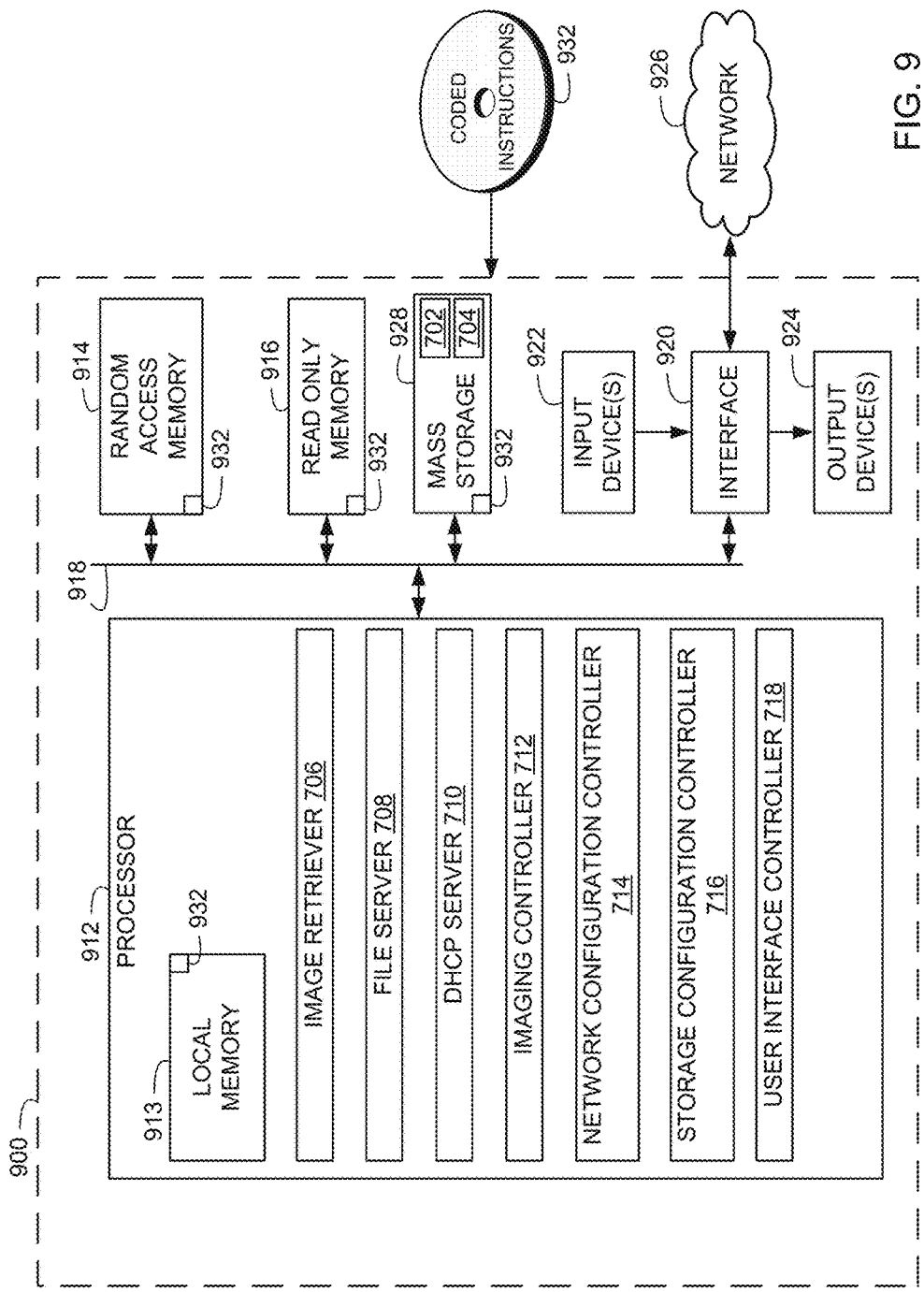
FIG. 9 is a block diagram of an example processing platform capable of executing the example machine-readable instructions of FIGS. 8 to implement the example virtual imaging appliance of FIGS. 1 and/or 4.

Next, as described in further detail in conjunction with FIGS. 7-9, the example system integrator 104 utilizes the example virtual imaging appliance 112 to image operating systems, drivers, management systems, software, etc. onto the physical rack 102 (block 160). The example images may be retrieved from the virtual system solutions provider 110 via the example network 108 and/or may be retrieved from a local repository or other source. The example system integrator 104 may additionally power on the physical rack 102 and perform testing to verify that the hardware is operating properly and/or that the images transferred to the physical rack 102 are operating properly.

After imaging the physical rack 102, the example system integrator 104 ships and/or otherwise delivers the physical rack 102 to the customer (block 162). Thus, the physical rack 102 has been pre-configured to allow the customer to power on the example physical rack 102 and quickly prepare the physical rack 102 for installation in a new and/or existing computing system (e.g., a cloud computing system). For example, upon initially powering on the example physical rack 102, the components of the example physical rack 102 are already configured to communicate with each other and execute operating systems and software, which allows the example physical rack 102 to provide an interface (e.g., a webpage interface) that, when accessed by the customer or an installer, gathers additional information for completing the configuration of the physical rack 102. For example, the interface may gather and/or configure user credentials, network information, information about networked components (e.g., an address for a storage device such as a storage area network (SAN), an address for a management system (e.g., a VMware vCenter server(s)), etc.). The gathered information can be utilized by the components of the example physical rack 102 to setup the physical rack 102 as a part of a new computing cluster and/or add the example physical rack 102 to an existing computing cluster (e.g., a cloud computing system).

While an example operation process is described in conjunction with blocks 150-162, any other process may be utilized. The order of the blocks may be changed. For example, the system integrator may receive and assemble the hardware for the example physical rack 102 (blocks 154-156) prior to receiving and/or installing the virtual imaging appliance 112. Furthermore, once the example system integrator 104 has received the example virtual imaging appliance 112, the system integrator 104 may assemble and/or image (block 154-160) multiple ones of the physical rack 102 using that same virtual imaging appliance 112.

Figure 2:
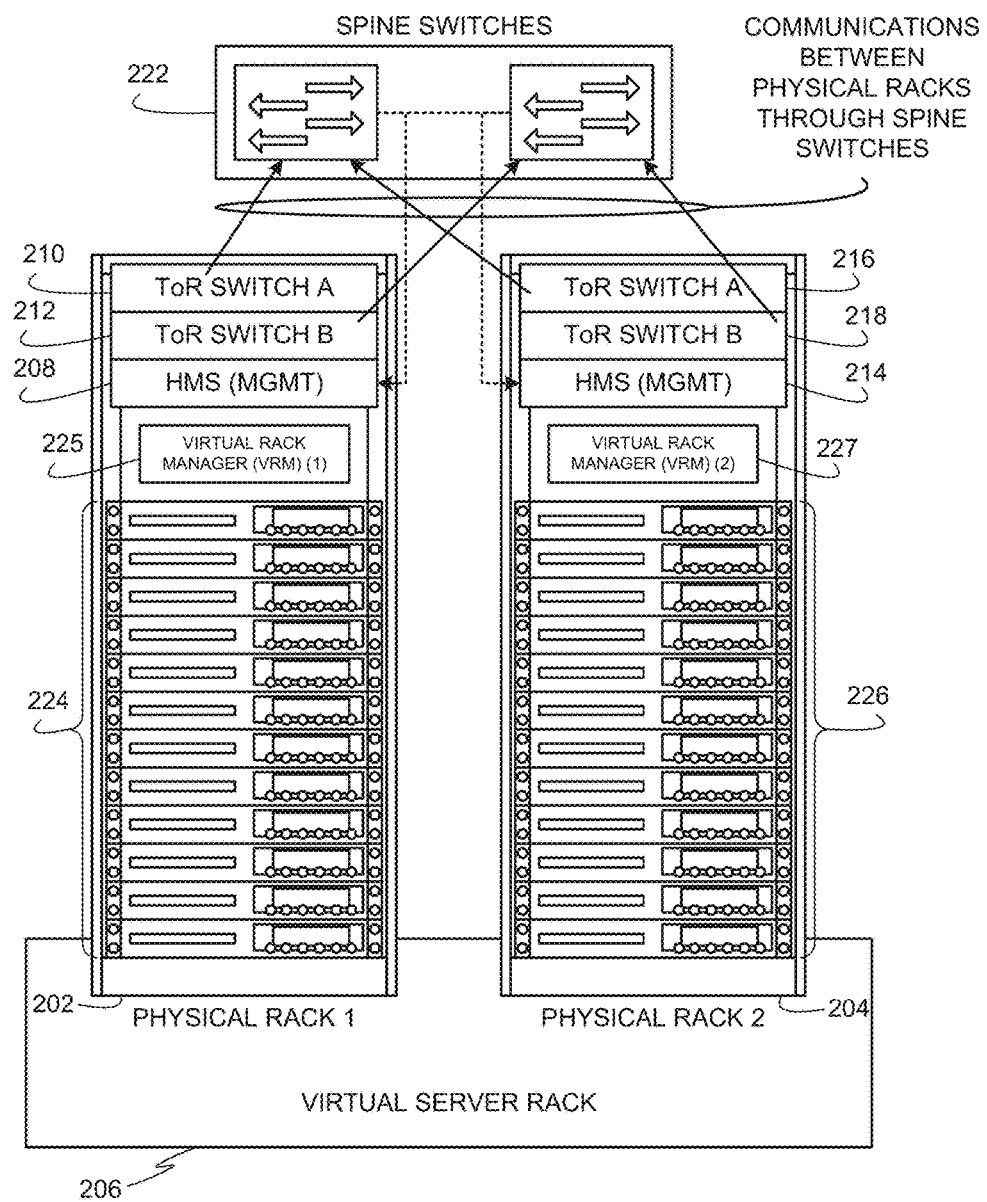
FIG. 2 depicts example physical racks in an example virtual server rack deployment.

FIG. 2 depicts example physical racks 202, 204 in an example deployment of a virtual server rack 206. For example, the physical racks 202, 204 may be ones of the physical rack 102 assembled by the example system integrator 104 of FIG. 1. In the illustrated example, the physical rack 202 has a hardware management system (HMS) 208, a top-of-rack (ToR) switch A 210, and a ToR switch B 212. The physical rack 204 of the illustrated example is also provided with a HMS 214, a ToR switch A 216, and a ToR switch B 218. The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, network interface cards, servers, switches, storage devices, peripherals, power supplies, etc.) of the physical racks 202, 204. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

Figure 3:
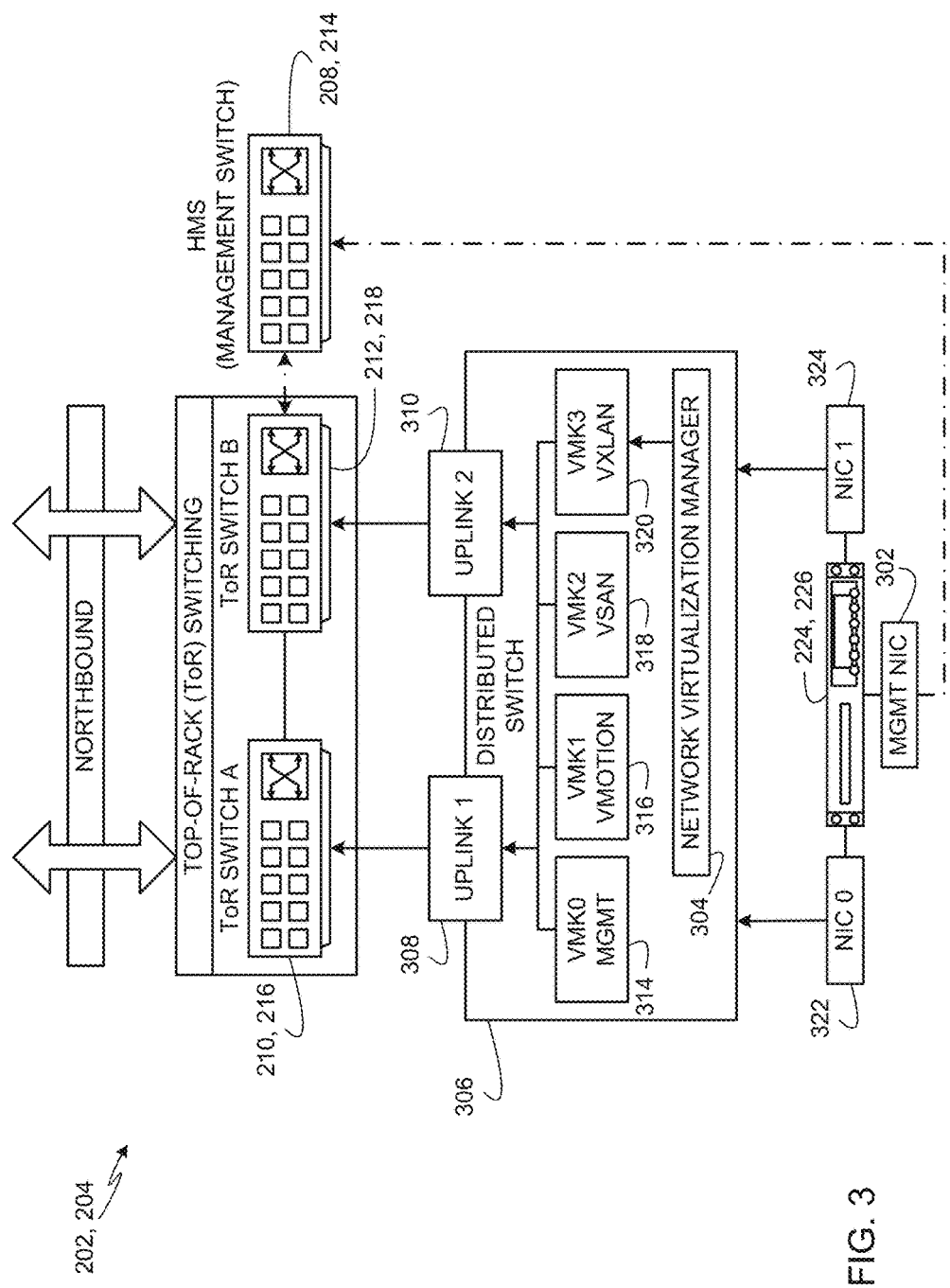
FIG. 3 depicts an example configuration of one of the example physical racks of FIG. 2.

FIG. 3 depicts an example configuration of one of the example physical racks 202, 204 of FIG. 2. In the illustrated example of FIG. 3, the HMS 208, 214 is in communication with a physical hardware resource 224, 226 through a management network interface card (NIC) 302. The example HMS 208, 214 is also shown in communication with the example ToR switches 210, 216, 212, 218. The example ToR switches 210, 216, 212, 218 are in communication with a distributed switch 306 through multiple uplink ports 308, 310 of the distributed switch 306. In the illustrated example, the uplink ports 308, 310 are implemented using separate network interface cards (NICs).

In the illustrated example, the distributed switch 306 runs numerous virtual adapters known as virtual machine kernels (VMKs) including an example VMK0 management kernel 314, an example VMK1 vMotion kernel 316, an example VMK2 vSAN kernel 318, and an example VMK3 VXLAN 320. The VMK0 management kernel 314 virtual adapter is software executed by the distributed switch 306 to manage use of ones of or portions of the physical hardware resources 224, 226 allocated for use by the distributed switch 306. In examples disclosed herein, the VRML 225 of FIG. 2 uses the VMK0 management kernel 314 to communicate with the VRM2 227 through the spine switches 222 of FIG. 2. The VMK1 vMotion 316 virtual adapter is software executed by the distributed switch 306 to facilitate live migration of virtual machines between physical hardware resources 224, 226 with substantially little or no downtime to provide continuous service availability from the virtual machines being migrated. The VMK2 vSAN 318 virtual adapter is software executed by the distributed switch 306 to aggregate locally attached data storage disks in a virtual cluster to create a storage solution that can be provisioned from the distributed switch 306 during virtual machine provisioning operations. The example VMK3 VXLAN 320 is virtual adapter software executed by the distributed switch to establish and/or support one or more virtual networks provisioned in the distributed switch 306. In the illustrated example, the VMK3 VXLAN 320 is in communication with an example network virtualization manager 304. The network virtualization manager 304 of the illustrated example virtualizes network resources such as physical hardware switches to provide software-based virtual networks. The example network virtualization manager 304 may be implemented using, for example, the VMware NSX network virtualization platform. In the illustrated example of FIG. 3, the distributed switch 306 is shown interfacing with one or more of the physical hardware resources 224, 226 through multiple NICs 322, 324. In this manner, the VM kernels 314, 316, 318, 320 can instantiate virtual resources based on one or more, or portions of, the physical hardware resources 224, 226.

The HMS 208, 214 of the illustrated examples of FIGS. 2 and 3, is a stateless software agent responsible for managing individual hardware elements in a physical rack 202, 204. The physical hardware resources 224, 226 that the HMS 208, 214 manages include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, the HMS 208, 214 may also be used to manage non-white label equipment such as original equipment manufacturer (OEM) equipment. Such OEM equipment includes OEM Servers such as Hewlett-Packard® (HP) servers and Lenovo® servers, and OEM Switches such as Arista switches, and/or any other OEM server, switches, or equipment.

Figure 4:
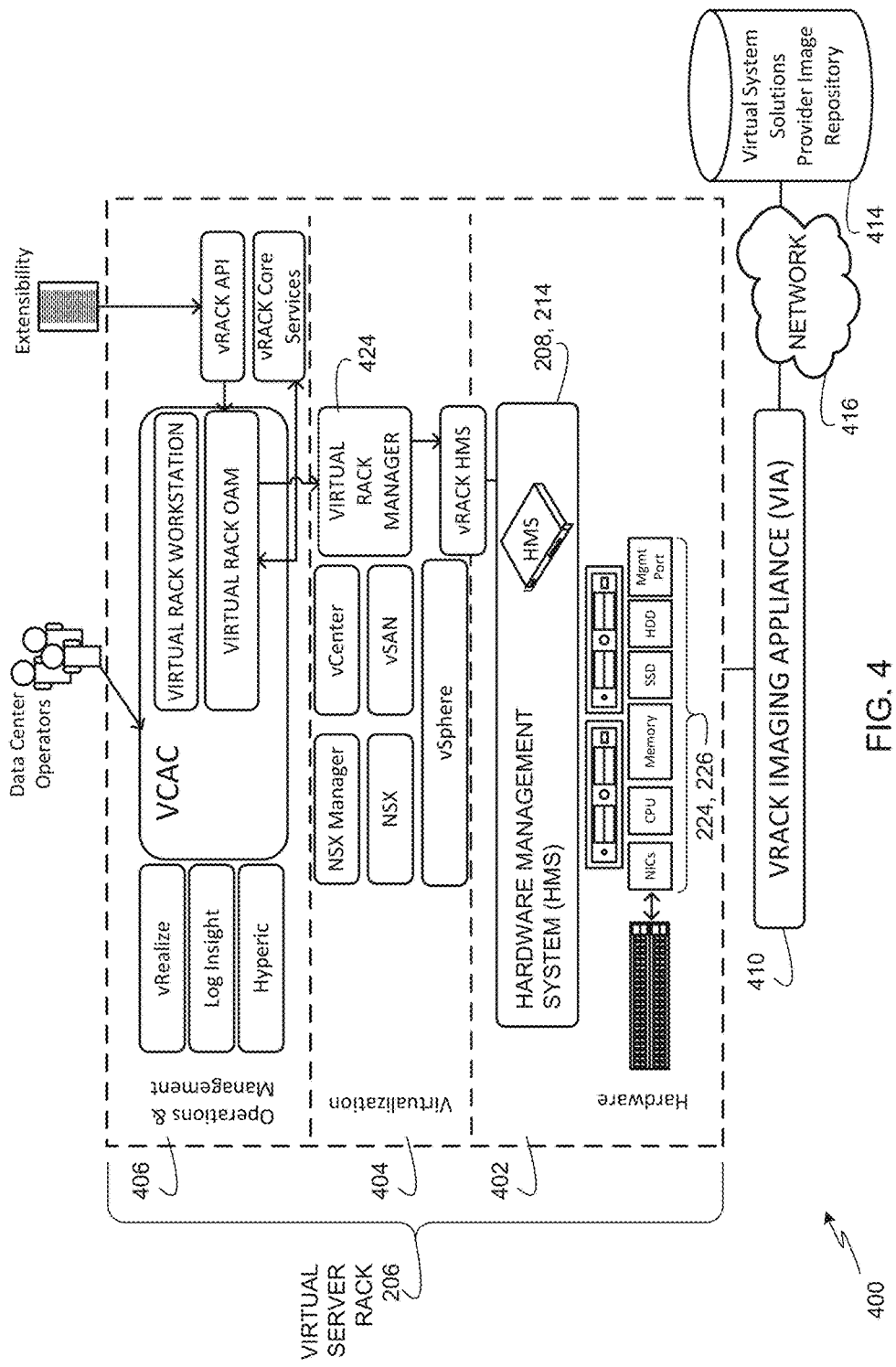
FIG. 4 depicts an example architecture to configure and deploy the example virtual server rack of FIG. 2.

FIG. 4 depicts an example architecture 400 in which an example virtual imaging appliance 410 (e.g., the example virtual imaging appliance 112 of FIG. 1) is utilized to configure and deploy the virtual server rack 206 (e.g., one or more of the example physical rack 102 of FIG. 1).

The example architecture 400 of FIG. 4 includes a hardware layer 402, a virtualization layer 404, and an operations and management layer 406. In the illustrated example, the hardware layer 402, the virtualization layer 404, and the operations and management layer 406 are part of the example virtual server rack 206 of FIG. 2. The virtual server rack 206 of the illustrated example is based on the physical racks 202, 204 of FIG. 2. Additionally or alternatively, the virtual server rack 206 may be based on the physical rack 102 of FIG. 1. For example, the physical rack 102 may be configured to be in communication with the physical racks 202, 204 to form part of the virtual server rack 206. Alternatively, any one of the physical racks 102, 202, 204 may be operated in a stand-alone manner to instantiate and run the virtual server rack 206. The example virtual server rack 206 is configured to configure the physical hardware resources 224, 226, to virtualize the physical hardware resources 224, 226 into virtual resources, to provision virtual resources for use in providing cloud-based services, and to maintain the physical hardware resources 224, 226 and the virtual resources. The example architecture 400 includes a virtual imaging appliance (VIA) 410 that communicates with the hardware layer 402 to store operating system (OS) and software images in memory of the hardware layer 402 for use in initializing physical resources needed to configure the virtual server rack 206. In the illustrated example, the VIA 410 retrieves the OS and software images from a virtual system solutions provider image repository 414 via an example network 416. For example, the VIA 410 may be the virtual imaging appliance 112 provided to the system integrator 104 of FIG. 1 by the example virtual system solutions provider 110 of FIG. 1 to configure new physical racks (e.g., the physical rack 102 of FIG. 1 and/or the physical racks 202, 204 of FIGS. 2 and 3) for use as virtual server racks (e.g., the virtual server rack 206). That is, whenever the system integrator 104 wishes to configure new hardware (e.g., a new physical rack) for use as a virtual server rack, the system integrator 104 connects the VIA 410 to the new hardware, and the VIA 410 communicates with the virtual system provider image repository 414 to retrieve OS and/or software images needed to configure the new hardware for use as a virtual server rack. In the illustrated example, the OS and/or software images located in the virtual system provider image repository 414 are configured to provide the system integrator 104 with flexibility in selecting to obtain hardware from any of a number of hardware manufacturers. As such, end users can source hardware from multiple hardware manufacturers without needing to develop custom software solutions for each hardware manufacturer. Further details of the example VIA 410 are disclosed in conjunction with FIGS. 7-9.

The example hardware layer 402 of FIG. 4 includes the HMS 208, 214 of FIGS. 2 and 3 that interfaces with the physical hardware resources 224, 226 (e.g., processors, network interface cards, servers, switches, storage devices, peripherals, power supplies, etc.). The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 102, 202, 204 including dual-redundant management switches and dedicated management ports attached to hosts and the ToR switches 210, 212, 216, 218 (FIGS. 2 and 3). In the illustrated example, one instance of the HMS 208, 214 runs per physical rack 102, 202, 204. For example, the HMS 208, 214 may run on a management switch installed in the example physical rack 102 of FIG. 1. In the illustrated example of FIG. 2 both of the HMSs 208, 214 are provided as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch on which the other HMS 208, 214 executes. In some examples, to achieve seamless failover, two instances of an HMS 208, 214 run in a single physical rack 102, 202, 204. In such examples, the physical rack 102, 202, 204 is provided with two management switches, and each of the two management switches runs a separate instance of the HMS 208, 214. In such examples, the physical rack 202 of FIG. 2 runs two instances of the HMS 208 on two separate physical hardware management switches, and the physical rack 204 of FIG. 2 runs two instances of the HMS 214 on two separate physical hardware management switches. In this manner, for example, one of the instances of the HMS 208 on the physical rack 202 serves as the primary HMS 208 and the other instance of the HMS 208 serves as the secondary HMS 208. The two instances of the HMS 208 on two separate management switches in the physical rack 202 (or the two instances of the HMS 214 on two separate management switches in the physical rack 204) are connected over a point-to-point, dedicated Ethernet link which carries heartbeats and memory state synchronization between the primary and secondary HMS instances.

The example virtualization layer 404 includes a virtual rack manager 424. The example virtual rack manager 424 communicates with the HMS 208, 214 to manage the physical hardware resources 224, 226. The example virtual rack manager 424 creates the example virtual server rack 206 out of underlying physical hardware resources 224, 226 that may span one or more physical racks (or smaller units such as a hyper-appliance or half rack) and handles physical management of those resources. The example virtual rack manager 424 uses the virtual server rack 206 as a basis of aggregation to create and provide operational views, handle fault domains, and scale to accommodate workload profiles. The example virtual rack manager 424 keeps track of available capacity in the virtual server rack 206, maintains a view of a logical pool of virtual resources throughout the SDDC life-cycle, and translates logical resource provisioning to allocation of physical hardware resources 224, 226. The example virtual rack manager 424 interfaces with components of the virtual system solutions provider 110 (FIG.1) such as vSphere®/vCenter™ and NSX™ manager, and presents the logical view of underlying resources such as hosts and clusters. The example virtual rack manager 424 also uses the logical view for orchestration and provisioning of workloads. Additional details of the virtual rack manager 424 are disclosed below in connection with FIG. 5.

The virtual server rack 206 of the illustrated example enables abstracting the physical hardware resources 224, 226. In some examples, the virtual server rack 206 includes a set of physical units (e.g., one or more racks) with each unit including hardware 224, 226 such as server nodes (e.g., compute+storage+network links), network switches, and, optionally, separate storage units. From a user perspective, the example virtual server rack 206 is an aggregated pool of logic resources exposed as one or more vCenter ESXi™ clusters along with a logical storage pool and network connectivity.

In the illustrated example, the example OAM layer 406 is an extension of a VMware vCloud® Automation Center (VCAC) that relies on the VCAC functionality and also leverages utilities such as vRealize, Log Insight™, and Hyperic® to deliver a single point of SDDC operations and management. The example OAM layer 406 is configured to provide different services such as heat-map service, capacity planner service, maintenance planner service, events and operational view service, and virtual rack application workloads manager service.

In the illustrated example, the heat map service of the OAM layer 406 exposes component health for hardware mapped to virtualization and application layers (indicate good, warning, and critical statuses). The example heat map service also weighs real-time sensor data against offered service level agreements (SLAs) and may trigger some logical operations to make adjustments to ensure continued SLA.

In the illustrated example, the capacity planner service of the OAM layer 406 checks against available resources and looks for potential bottlenecks before deployment of an application workload. Example capacity planner service also integrates additional rack units in the collection/stack when capacity is expanded.

In the illustrated example, the maintenance planner service of the OAM layer 406 dynamically triggers a set of logical operations to relocate virtual machines (VMs) before starting maintenance on a hardware component to increase the likelihood of substantially little or no downtime. The example maintenance planner service of the OAM layer 406 creates a snapshot of the existing state before starting maintenance on an application. The example maintenance planner service of the OAM layer 406 automates software upgrade/maintenance by creating a clone of the machines and proceeds to upgrade software on clones, pause running machines, and attaching clones to network. The example maintenance planner service of the OAM layer 406 also performs rollbacks if upgrades are not successful.

In the illustrated example, events and operational views service of the OAM layer 406 provides a single dashboard for logs by feeding to Log Insight. The example events and operational views service of the OAM layer 406 also correlates events from the heat map service against logs (e.g., a server starts to overheat, connections start to drop, lots of HTTP/503 from App servers). The example events and operational views service of the OAM layer 406 also creates a business operations view (e.g., a top down view from Application Workloads=>Logical Resource View=>Physical Resource View). The example events and operational views service of the OAM layer 406 also provides a logical operations view (e.g., a bottom up view from Physical resource view=>vCenter ESXi Cluster View=>VM's view).

In the illustrated example, the virtual rack application workloads manager service of the OAM layer 406 uses vCAC and vCAC enterprise services to deploy applications to vSphere hosts. The example virtual rack application workloads manager service of the OAM layer 406 uses data from the heat map service, the capacity planner service, the maintenance planner service, and the events and operational views service to build intelligence to pick the best mix of applications on a host (e.g., not put all high CPU intensive apps on one host). The example virtual rack application workloads manager service of the OAM layer 406 optimizes applications and virtual storage area network (vSAN) arrays to have high data resiliency and best possible performance at same time.

Figure 5:
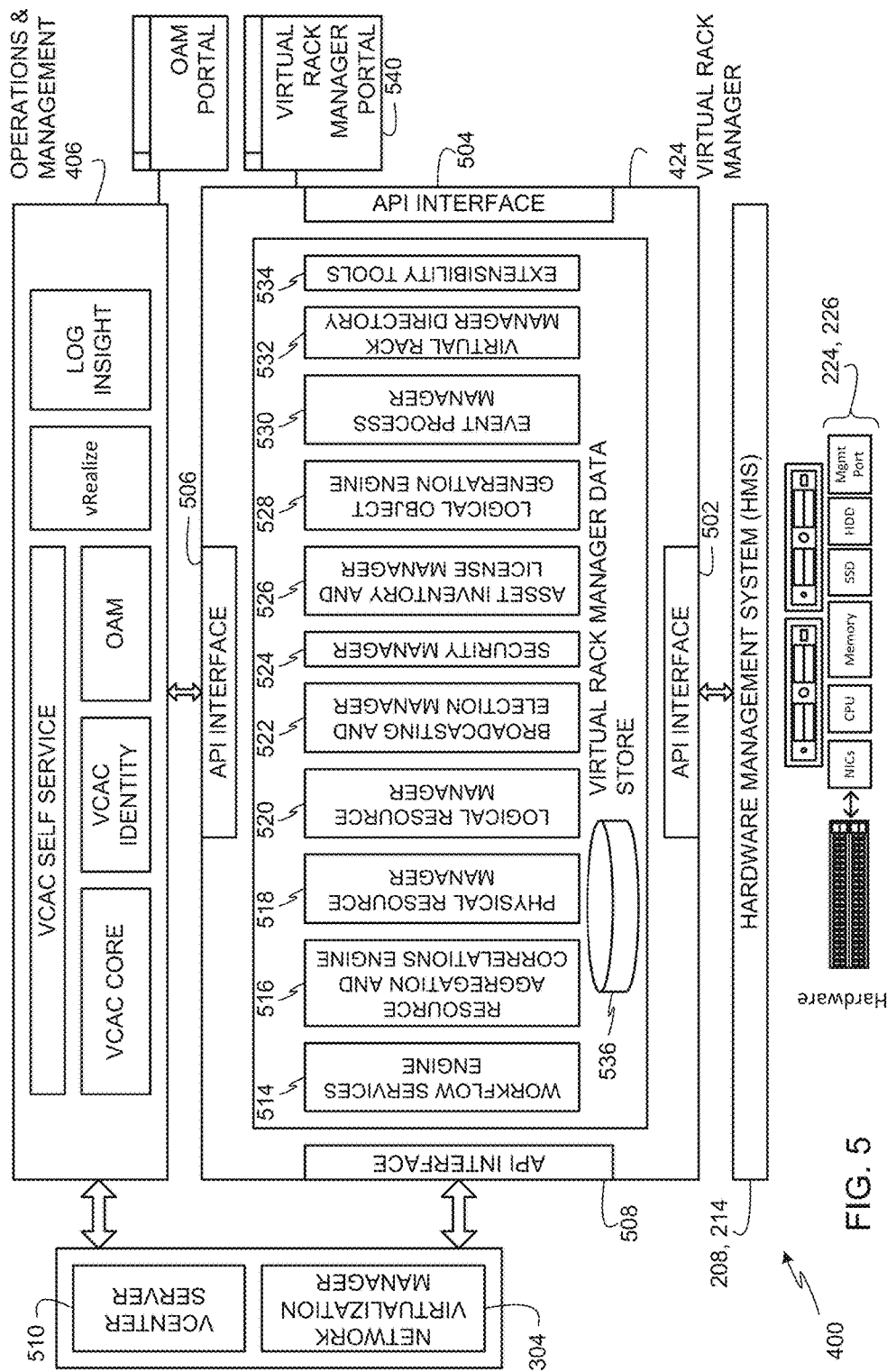
FIG. 5 depicts the example hardware management system (HMS) of FIGS. 2-4 interfacing between the example hardware and an example configuration manager (CM) of the example architecture of FIG. 4.

FIG. 5 depicts another view of the example architecture 400 of FIG. 4 showing the example HMS 208, 214 of FIGS. 2-4 interfacing between the example physical hardware resources 224, 226 of FIGS. 2-4 and the example virtual rack manager 424 of the example architecture 400 of FIG. 4. In the illustrated example, the virtual rack manager 424 includes numerous application program interfaces (APIs) 502, 504, 506, 508 to interface with other components of the architecture 400. The APIs 502, 504, 506, 508 of the illustrated example include routines, protocols, function calls, and other components defined for use by external programs, routines, or components to communicate with the virtual rack manager 424. Such communications may include sending information to the virtual rack manager 424, requesting information from the virtual rack manager 424, requesting the virtual rack manager 424 to perform operations, configuring the virtual rack manager 424, etc. For example, an API interface 502 of the virtual rack manager 424 is to facilitate communications between the HMS 208, 214 and the virtual rack manager 424, another API interface 506 of the virtual rack manager 424 is to facilitate communications between the operations and management layer 406 and the virtual rack manager 424, and another API interface 508 of the virtual rack manager 424 is to facilitate communications between the virtual rack manager 424 and the network virtualization manager 304 and a vCenter server 510. Another API interface 504 of the virtual rack manager 424 may be used to facilitate communications between the virtual rack manager 424 and user interfaces for use by administrators to manage the virtual rack manager 424.

The example virtual rack manager 424 communicates with the HMS 208, 214 via the API interface 502 to manage the physical hardware resources 224, 226. For example, the virtual rack manager 424 obtains and maintains inventory of the physical hardware resources 224, 226 through communications with the HMS 208, 214. The example virtual rack manager 424 also uses the HMS 208, 214 to discover new hardware (e.g., the physical hardware resources 224, 226) and adds newly discovered hardware to inventory. The example virtual rack manager 424 is also configured to manage the physical hardware resources 224, 226 within the virtual server rack 206 by using the per-rack HMS 208, 214. The example virtual rack manager 424 maintains the notion of fault domains and uses those domains in its mapping of logical resources (e.g., virtual resources) to the physical hardware resources 224, 226. In response to notification of hardware events from the HMS 208, 214, the example virtual rack manager 424 handles addition/removal of physical hardware resources 224, 226 (e.g., servers or switches at a physical rack level), addition of new rack units, maintenance, and hard shutdowns/resets. The example virtual rack manager 424 also translates physical sensor data and alarms to logical events.

In the illustrated example of FIG. 5, a software stack of the virtual rack manager 424 includes an example workflow services engine 514, an example resource aggregation and correlations engine 516, an example physical resource manager 518, an example logical resource manager 520, an example broadcasting and election manager 522, an example security manager 524, an example asset inventory and license manager 526, an example logical object generation engine 528, an example event process manager 530, an example virtual rack manager directory 532, and example extensibility tools 534. The example virtual rack manager 424 also includes an example virtual rack manager data store 536. The example workflow services engine 514 is provided to manage the workflows of services provisioned to be performed by resources of the virtual server rack 206. The example resource aggregation and correlations engine 516 is provided to aggregate logical and physical resources and to coordinate operations between the logical and physical resources for allocating to services to be performed by the virtual server rack 206. The example physical resource manager 518 is provided to provision, maintain, allocate, and manage the physical hardware resources 224, 226 for use by the virtual server rack 206 for provisioning and allocating logical resources. The example logical resource manager 520 is provided to provision, maintain, allocate, and manage logical resources. The example broadcasting and election manager 522 is provided to broadcast or advertise capabilities of the virtual server rack 206. For example, services seeking resources of virtual server racks may obtain capabilities (e.g., logical resources) that are available from the virtual server rack 206 by receiving broadcasts or advertisements of such capabilities from the broadcasting and election manager 522. The broadcasting and election manager 522 is also configured to identify resources of the virtual server rack 206 that have been requested for allocation. The example security manager 524 is provided to implement security processes to protect from misuse of resources of the virtual server rack 206 and/or to protect from unauthorized accesses to the virtual server rack 206. The example asset inventory and license manager 526 is provided to manage inventory of components of the virtual server rack 206 and to ensure that the different components of the virtual server rack 206 are used in compliance with licensing requirements. In the illustrated example, the example asset inventory and license manager 526 also communicates with licensing servers to ensure that the virtual server rack 206 has up-to-date licenses in place for components of the virtual server rack 206. The example logical object generation engine 528 is provided to generate logical objects for different portions of the physical hardware resources 224, 226 so that the logical objects can be used to provision logical resources based on the physical hardware resources 224, 226. The example event process manager 530 is provided to manage instances of different processes running in the virtual server rack 206. The example virtual rack manager directory 532 is provided to track identities and availabilities of logical and physical resources in the virtual server rack 206. The example extensibility tools 534 are provided to facilitate extending capabilities of the virtual server rack 206 by adding additional components such as additional physical racks to form the virtual server rack 206. The example virtual rack manager data store 536 is provided to store configuration information, provisioning information, resource allocation information, and/or any other information used by the virtual rack manager 424 to manage hardware configurations, logical configurations, workflows, services, etc. of the virtual server rack 206. In the illustrated example, the virtual rack manager 424 may be configured by an administrator that accesses the virtual rack manager 424 through an example virtual rack manager portal 540 that is a web-based interface that provides access to one or more of the components of the virtual rack manager 424.

In the illustrated example, the operations and management layer 406 is in communication with the virtual rack manager 424 via the API interface 506 to provide different services such as heat-map service, capacity planner service, maintenance planner service, events and operational view service, and virtual rack application workloads manager service. In the illustrated example, the network virtualization manager 304 and the vCenter server 510 are in communication with the virtual rack manager 424 to instantiate, manage, and communicate with virtual networks and virtual infrastructures. For example, the network virtualization manager 304 of the illustrated example virtualizes network resources such as physical hardware switches to provide software-based virtual networks. The example vCenter server 510 provides a centralized and extensible platform for managing virtual infrastructures. For example, the vCenter server 510 provides centralized management of virtual hosts and virtual machines from a single console. The vCenter server 510 of the illustrated example communicates with the virtual rack manager 424 via the API interface 508 to provide administrators with views of and access to configurations of the virtual server rack 206.

Figure 6:
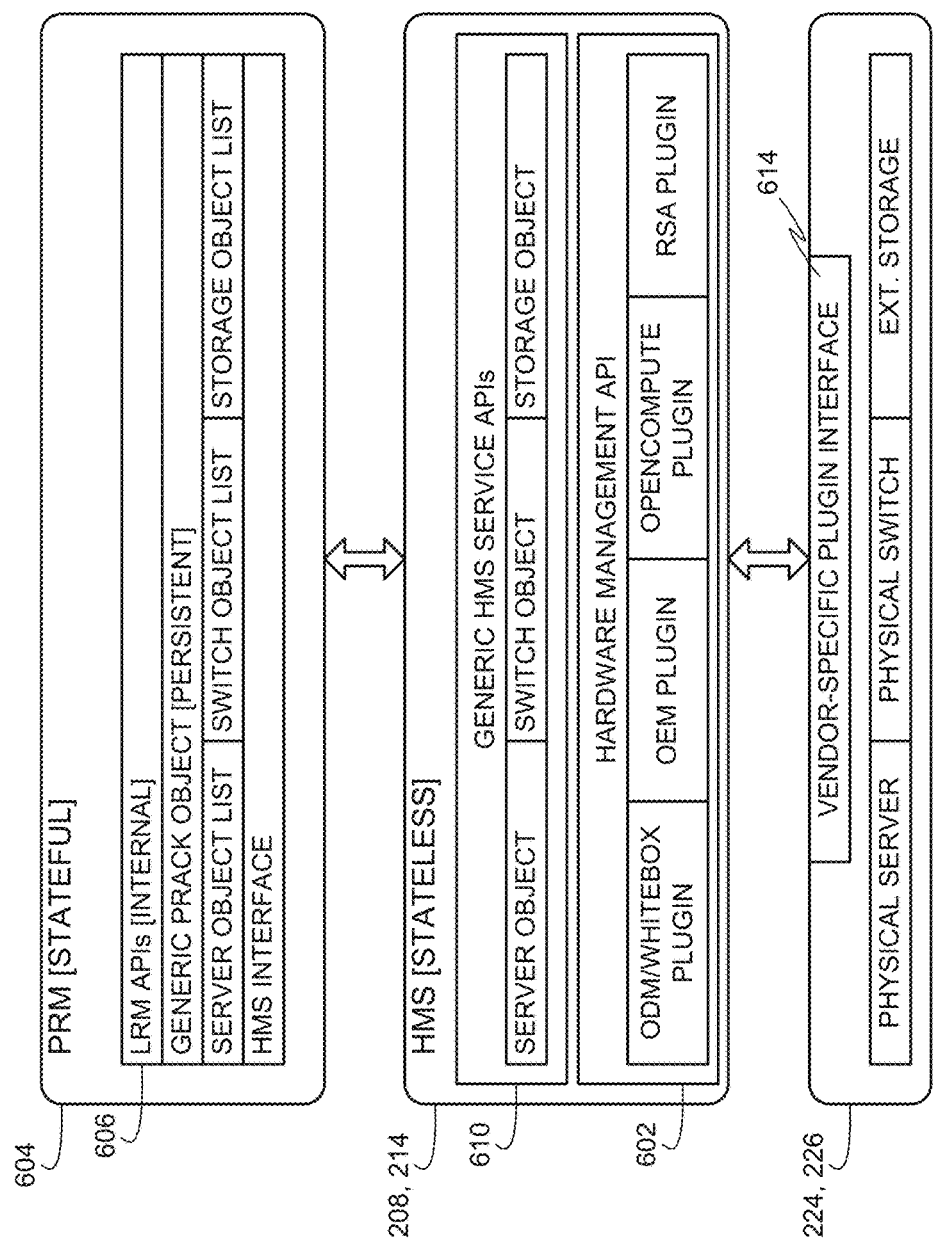
FIG. 6 depicts an example hardware management application program interface (API) of the HMS of FIGS. 2-5 that is between example hardware resources and an example physical rack resource manager (PRM).

FIG. 6 depicts an example hardware management application program interface (API) 602 of the HMS 208, 214 of FIGS. 2-5 that is between the example physical hardware resources 224, 226 of FIGS. 2-5 and an example physical rack resource manager (PRM) 604. The example PRM 604 is a component of the virtual rack manager 424 (FIGS. 4 and 5) in the software stack of the virtual server rack 206 (FIG. 2). An example PRM 604 is provided in each physical rack 202, 204 and is configured to manage corresponding physical hardware resources 224, 226 of the corresponding physical rack 202, 204 (FIG. 2) and to maintain a software physical rack object for the corresponding physical rack 202, 204. The example PRM 604 interfaces with the corresponding HMS 208, 214 of the same physical rack 202, 204 to manage individual physical hardware resources 224, 226. The example PRM 604 also provides a set of API's 606 for use of the physical rack object by an example Logical Resource Manager (LRM). An LRM interacts with individual PRM instances to employ physical resources based on physical resource requirements of the LRM. In some example, the PRM 604 runs as part of an LRM application on a given server node in a virtual server rack 206.

In the illustrated example of FIG. 6, the HMS 208, 214 publishes a set of generic HMS service APIs 610 for use by original equipment manufacturers (OEMs) to integrate hardware or software with the software stack of the virtual server rack 206. In the illustrated example, the integration point for OEM components is the hardware management API 602. In the illustrated example, vendor-specific plugin interfaces 614 may be developed for use by the hardware management API 602 to facilitate communications with physical hardware resources 224, 226 of particular vendors having vendor-specific interfaces. In the illustrated example, such vendor-specific plugin interfaces 614 interface to corresponding physical hardware resources 224, 226 using interface protocols supported by the underlying hardware components (e.g., an intelligent platform management interface (IPMI) API, a representational state transfer (REST) API, an extensible markup language (XML) API, a hypertext transfer protocol (HTTP) API, a customer information manager (CIM) API, etc.).

In the illustrated example, the HMS 208, 214 provides a set of example generic HMS service APIs 610 for use by the PRM 604 to access use of virtual resources based on the physical hardware resources 224, 226. In the illustrated example, the generic HMS service APIs 610 are implemented using a REST/JSON (JavaScript object notation) API protocol. However, any other API protocol may be used. The example generic HMS service APIs 610 act on the underlying physical hardware resources 224, 226, which are encapsulated in a set of software objects such as server objects, switch objects, and storage objects. The example HMS 208, 214 internally maintains the hardware management API 602 to service API requests received at the generic HMS service APIs 610. The hardware management API 602 in turn depends on vendor-specific plugin interfaces 614 to interface to the actual physical hardware resources 224, 226. Such vendor-specific interfaces 614 may be proprietary to corresponding OEM vendors for hardware management. Regardless of whether the vendor-specific interfaces 614 are proprietary, or part of an industry standard or open interface, the published hardware management API 602 is configured to work seamlessly between the PRM 604 and the physical hardware resources 224, 226.

In some example implementations, two mechanisms for managing the physical hardware resources 224, 226 include out-of-band (OOB) management and in-band (IB) management. An OOB component of the HMS 208, 214 may be configured to run on a physical management switch and an IB component of the HMS 208, 214 can be configured to run as part of the PRM 604 and/or the VRMs 225, 227 (FIG. 2). Such separation of IB management and OOB management components of the HMS 208, 214 facilitates increased resiliency of HMS 208, 214 in case of failure of either of the IB management channel or the OOB management channel. Such IB and OOB management separation also simplifies the network configuration of the ToR switches 210, 212, 216, 218 (FIGS. 2 and 3) and keeps the management network isolated for security purposes. Keeping a single point of generic HMS service APIs between the PRM 604 and the HMS 208, 214 facilitates hiding all hardware and vendor specificities of hardware management in the HMS 208, 214 and isolating that complexity from upper layer processes in the PRM 604 and/or a LRM.

FIG. 7 is a block diagram of an example implementation of the virtual imaging appliance 112 of FIG. 1. The example virtual imaging appliance 112 of FIG. 7 may additionally or alternatively be utilized to implement the example virtual imaging appliance 410 of FIG. 4. The virtual imaging appliance 112 of example FIG. 7 includes an example configuration database 702, an example local repository 704, an example image retriever 706, an example file server 708, an example dynamic host configuration protocol (DHCP) server 710, an example imaging controller 712, an example network configuration controller 714, an example storage configuration controller 716, and an example user interface controller 718.

The example virtual imaging appliance 702 stores configuration information utilized for deploying the physical rack 102 in the example configuration database 702. According to the illustrated example, the example configuration database 702 stores default configuration information established by the example virtual system solutions provider 110 and configuration information set by the example system integrator 104. For example, the virtual system solutions provider 110 may establish and/or store in the example configuration database 702 default networking information (e.g., private networking addresses for the various components of the physical rack 102) to be utilized by the physical rack 102 and the virtual imaging appliance 112 until the customer sets the network information during the first power on for final deployment. The example system integrator 104 may adjust and/or replace the configuration with desired configuration information (e.g., may replace the default networking information with networking information utilized by a network of the system integrator 104). The example configuration database 702 may store any other type of configuration information such as, for example, user credentials of the example system integrator 104, default user credentials to be installed on the example physical rack 102, profiles for operating systems, software, drivers, etc. to be utilized when configuring the physical rack 102, etc.

The example configuration database 702 is a database that is deployed in the virtual imaging appliance 112. Alternatively, the example configuration database 702 may be any other type of storage (e.g., a file, a folder, a removable storage, etc.) and/or may be implemented at any other location (e.g., may be a remotely located database, may be a database on another computing device of the system integrator 104, etc.).

The example local repository 704 stores software images (e.g., operating system images, software images, drivers, etc.) retrieved by the example image retriever 706 from the example virtual system solutions provider 112 and are transferred to the example physical rack 102 during deployment by the example file server 708 and/or the example imaging controller 712. The example local repository 704 is a software repository database that acts as a cache for software images so that the example image retriever 706 does not need to retrieve the same images multiple times. The local repository 704 may, alternatively, be any other type of storage space for storing the software images. In another alternative, the local repository 704 may not be utilized in the example virtual imaging appliance 112 when all software images will be retrieved on-the-fly from their source (e.g., a local source or a remote source such as the virtual system solutions provider 110).

The example image retriever 706 communicates with the example virtual system solutions provider 110 to retrieve software images for deployment to the example physical rack 102. According to the illustrated example, the image retriever 706 determines the appropriate images to retrieve based on at least one of: 1) information received from the example imaging controller 712 (e.g., based on device identities determined from information received by the example DHCP server 710), 2) information about components of the example physical rack 102 received from a user via the example user interface controller 718. The example image retriever 706 stores the retrieved software images in the example local repository 704. Alternatively, the image retriever 706 may push the software images directly to the example physical rack 102 via the file server 708 as the software images are retrieved.

The file server 708 of the illustrated example provides an interface(s) for transferring software images and/or any other data (e.g., configuration information, commands, etc.) to the example physical rack 102 during deployment by the example virtual imaging appliance 112. For example, the file server 708 may server data using one or more of: a trivial file transfer protocol (TFTP), a file transfer protocol (FTP), a web server protocol (e.g., hypertext transfer protocol (HTTP), a JAVA interface, a PHP Hypertext Preprocessor (PHP) interface, etc.), a pre-boot execution environment (PXE), etc. The example file server 708 includes multiple interfaces and/or protocols to facilitate file transfer to the various components of the example physical rack 102. For example, network switches (e.g., management switches such as the HMS 208, 214 of FIG. 2) may be utilized TFTP for loading firmware and/or configuration data on the network switches, PXE may be utilized for loading an operating system (e.g., the VMware ESXi hypervisor) on a computing device (e.g., the physical hardware resources 224, 226 of FIG. 2) using TFTP, an HTTP interface may be utilized for sending command and/or instructions to software executing on the example physical rack 102.

The example file server 708 pushes files to the example physical rack 102. For example, in response to instructions from the example imaging controller 712, the example file transfer 708 opens a connection with a corresponding interface on a component of the physical rack 102 and transfers files as instructed by the example imaging controller 712. Alternatively, the file server 708 may utilize any other communication structure (e.g., may serve files in a response to requests from components of the physical rack 102 (e.g., when the example imaging controller 712 sends commands to the components of the physical rack 102 to retrieve files from the example file server 708) and/or may utilize an combination of pushing and hosting files.

The example DHCP server 710 receives requests for network addresses from components of the physical rack 102 and issues network addresses to be utilized by the components to allow communication among the components and the example virtual imaging appliance 112 during deployment by the example system integrator 104. In addition, the example DHCP server 710 extracts device identification information from DHCP requests transmitted by the components of the example physical rack 102. According to the illustrated example, the example DHCP server 710 retrieves a vendor class identifier (VCI) from a DHCP request to identify the device that transmitted the request. For example, the example DHCP server 710 may compare the VCI to a list of vendor identifiers stored in the example configuration database 702 to determine the device type, vendor, hardware revision, installed firmware version, etc. for the component of the physical rack 102 that transmitted a DHCP request. Alternatively, any other information included in a DHCP request (e.g., media access control (MAC) address) may be utilized by the DHCP server 710 to identify the device that transmitted the DHCP request. The example DHCP server 710 transmits information about devices that sent requests and/or the addresses assigned to the devices by the DHCP server 710 to the example imaging controller 712 for use by the imaging controller 712 in transmitting images and configurations to the devices. Additionally or alternatively, the DHCP server 710 may cause the information to be stored in the example configuration database 702.

The imaging controller 712 of the example virtual imaging appliance 112 of FIG. 7 controls the imaging and configuration installation on the example physical rack 102. The example imaging controller 712 receive instructions and/or device information from the example user interface controller 718, receives device and/or networking information from the example DHCP server 710, causes the example image retriever 706 to retrieve the needed software images (if the images are not already stored in the example local repository 704), and causes the file server 708 to transfer the appropriate software images to the example physical rack 102.

In addition to causing the software images to be transferred to the example physical rack 102, the example imaging controller 712 additionally interfaces with the components of the example physical rack 102 to install, deploy, and/or instantiate the software images. For example, the example imaging controller 712 may communicate instructions, commands, operands, etc. to the example physical rack 102 via, for example, a secure shell (SSH) or other command line interface, instruction interface, graphical interface, etc. An example process that includes such installing, deploying, and/or instantiating is described in further detail in conjunction with FIG. 8.

The example imaging controller 712 additionally performs testing on the example physical rack 102 following deployment of software images and configurations by the example virtual imaging appliance 112. According to the illustrated example, the example imaging controller 712 powers on the rack and allows the installed software to load. The example imaging controller 712 then performs testing to verify that the software has successfully booted, that the components of the example physical rack 102 are accessible at their configured network locations, that no errors were generated by components of the physical rack 102 during booting, etc. The results of the testing are provided to the user interface controller 718 for presentation to users of the example virtual imaging appliance 112.

The example network configuration controller 714 of FIG. 7 manages the network configuration of the example physical rack 102 during deployment by the example virtual imaging appliance 112. According to the illustrated example, after software images have been pushed to the example physical rack 102, the example network configuration controller 714 configures networking resources (e.g., physical switches, virtual networking elements such as virtual switches, routers, etc.). For example, the example network configuration controller 714 may enable ports, installing licenses, install software, configure user credentials, etc. Alternatively, if the software images retrieved by the image retriever 706 are preconfigured with network configuration information, the example virtual imaging appliance 112 may not include the network configuration controller 714.

The example storage configuration controller 716 of FIG. 7 configures storage devices (e.g., physical storage devices and/or virtual storage devices) of the example physical rack 102. For example, the example storage configuration controller 716 may install a storage controller, may configure rules in a storage device (e.g., a physical storage device and/or a virtual storage device), may add a storage device to a storage cluster, may deploy a virtual storage area network, etc.

The example user interface controller 718 of the illustrated example, provides a user interface for a user of the example system integrator 104 to control and/or manage the implementation of the virtual imaging appliance 112 and the deployment of the physical rack 102. According to the illustrated example, the example user interface controller 718 is implemented by a web server that provides a web page user interface by which the user can interact with the virtual imaging appliance 112. Alternatively, the user interface controller 718 may provide any other type of interface The example user interface controller 718 provides user interfaces to input configuration information (e.g., configuration information for the network of the example system integrator 104), device information (e.g., to identify devices utilized by the example system integrator 104 in assembling the example physical rack 102), to request deployment (e.g., to initiate deploying configuration information, software images, etc.), and to report results of the deployment (e.g., confirmations that software images and/or configuration information were successfully deployed and/or the results of testing performed on the physical rack 102 by the example virtual imaging appliance 112, etc.). Alternatively, any other user interfaces for controlling and/or monitoring deployment of the physical rack 102 may be provided by the user interface controller 718.

While an example manner of implementing the virtual imaging appliance 112 of FIGS. 1 and/or 4 is illustrated in FIG. 7, one or more of the elements, processes and/or devices illustrated in FIG. 7 may be combined, divided, re-arranged, omitted, eliminated and/or implemented in any other way. Further, the example configuration database 702, the example local repository 704, the example image retriever 706, the example file server 708, the example DHCP server 710, the example imaging controller 712, the example network configuration controller 714, the example storage configuration controller 716, the example user interface controller 718, and/or, more generally, the example virtual imaging appliance 112 of FIGS. 1 and/or 4 may be implemented by hardware, software, firmware and/or any combination of hardware, software and/or firmware. Thus, for example, any of the example configuration database 702, the example local repository 704, the example image retriever 706, the example file server 708, the example DHCP server 710, the example imaging controller 712, the example network configuration controller 714, the example storage configuration controller 716, the example user interface controller 718, and/or, more generally, the example virtual imaging appliance 112 of FIGS. 1 and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, configuration database 702, the example local repository 704, the example image retriever 706, the example file server 708, the example DHCP server 710, the example imaging controller 712, the example network configuration controller 714, the example storage configuration controller 716, the example user interface controller 718, and/or, the example virtual imaging appliance 112 of FIGS. 1 and/or 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example virtual imaging appliance 112 of FIGS. 1 and/or 4 may include one or more elements, processes and/or devices in addition to, or instead of, those illustrated in FIG. 7, and/or may include more than one of any or all of the illustrated elements, processes and devices.

A flowchart representative of example machine readable instructions for implementing the virtual imaging appliance 112 of FIGS. 1, 4, and/or 7 is shown in FIG. 8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example virtual imaging appliance 112 may alternatively be used. For example, the order of execution of the blocks may be changed, and/or some of the blocks described may be changed, eliminated, or combined.

As mentioned above, the example process of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 8 begins at block 802, retrieves a manifest file for deploying the example physical rack 102. The example manifest file identifies a software bundle to be utilized for deploying a physical rack (e.g., the example physical rack 102). The manifest file may be retrieved from the example configuration database 702 and/or may be retrieved from the virtual system solutions provider 110 via the example image retriever 706. The example imaging controller 712 may select the manifest file by determining information about the example physical rack 102 to be deployed (e.g., by receiving an identification of the physical rack 102 components from a user at the system integrator 104 via a user interface provided by the example user interface controller 718) and/or by determining information about the system integrator 104 (e.g., the virtual systems solution provider 110 may provide a customized manifest file for particular ones of the system integrator 104). Additionally or alternatively, the manifest file may be selected in any other manner (e.g., the manifest file may be selected by a user utilizing a user interface provided by the example user interface controller 718).

Based on the information in the retrieved manifest file (block 802), the example imaging controller 712 determines if software images for software identified in the manifest file are available in the example local repository 704 (block 804). When the example imaging controller 712 determines that all of the software images are available in the example local repository (e.g., the software images do not need to be retrieved from a remote repository, control proceeds to block 810. Alternatively, when the example imaging controller 712 determines that some or all of the software images are not available in the example local repository, the example imaging controller 712 instructs the example image retriever 706 to retrieve the needed software images from the example virtual system solutions provider 110 (or another repository(ies)) via the example network 108 (block 806). The example image retriever 706 stores the retrieved images in the example local repository 704 (block 808).

After the example local repository 704 has been loaded with the needed software images (e.g., after block 804 or block 808), the example user interface controller 718 receives a request to image a physical rack (e.g., the physical rack 102 of FIG. 1) (block 810). For example, blocks 802 to 808 may be completed at a first time when the example system integrator 104 is preparing to have the ability to deploy physical racks and the user interface controller 718 may await a user request to image a particular physical rack.

The example DHCP server 710 then starts (block 812). For example, the example user interface controller 718 may transmit an instruction that causes the DHCP server 710 to be started so that the DHCP server 710 is ready to receive DHCP requests. The example DHCP server 710 then receives DHCP request(s) from the components (e.g., the ToR switches 210, 212, 216, 218; the HMSs 208, 214; the physical hardware resources 224, 226; etc.) of the physical rack 102 (e.g., of the example physical rack 202, 204) (block 814). For example, after 1) the hardware components of the physical rack 102 have been assembled (block 156 of FIG. 1), 2) the wiring has been connected (block 158 of FIGS. 1), and 3) power is applied to the components of the example physical rack 102, the example components may automatically broadcast DHCP request(s) that are received by the example DHCP server 710.

The example DHCP server 710 determines device information from the received DHCP requests (block 816). For example, the DHCP server 710 may analyze a vendor identifier included in a DHCP request to identify the component that transmitted the request. When determining the device information, the example DHCP server 710 may additionally transmit network addresses (e.g., internet protocol (IP) addresses to the components of the example physical rack 102 to satisfy the DHCP request(s)). For example, the DHCP server 710 may determine the network addresses to be transmitted to components by comparing the device identification information determined in block 814 with information in the manifest file retrieved in block 802 and/or with information in the example configuration database 702. For example, the manifest file may identify particular network addresses for each of the devices so that the example virtual imaging appliance 112 can communicate with the particular devices using known addresses. Alternatively, the DHCP server 710 may assign addresses to the components (e.g., randomly, serially, etc.) and may record the assigned addresses with device identification information in the example configuration database 702.

The example imaging controller 712 then determines, based on the device information, whether the device that transmitted the DHCP request is a network switch (block 818).

If the device that transmitted the request is not a network switch (e.g., the device is a processing device such as a server) (block 818), the example imaging controller 712 then installs a hypervisor on the device (e.g., the processing device installed in the example physical rack 102) (block 820). For example, the example imaging controller 712 may utilize an OOB interface to instruct the processing units (e.g., the example physical hardware resources 224, 226) to perform a PXE boot, to retrieve the hypervisor software image (e.g., a VMware ESXi software image) via the example file server 708, and to install the hypervisor.

The example imaging controller 712 then installs a storage driver(s) identified in the manifest file (block 822). For example, imaging controller 712 may cooperate with the example storage configuration controller 716 to install a virtual storage area network (VSAN) storage controller in one of the hypervisor environments via the example file server 708 to facilitate management of a VSAN implemented on the storage provided by the processing units of the example physical rack 102. For example, the example storage configuration controller 716 may configure a VSAN (or multiple VSANs) in the VSAN storage controller utilizing storage devices provided in the processing units of the example physical rack 102.

The example imaging controller 712 then causes a cloud management image to be installed on one or more of the processing units (block 824). For example, the example imaging controller 712 may cause the example file server 708 to transfer a cloud management software image (e.g., a VMware vCenter software image) to one of the processing units in the example physical rack 102 and the example imaging controller 712 may then install and configure the cloud management image. For example, the example imaging controller 712 may cause the multiple hypervisors of the processing units in the example physical rack 102 to be added to the cloud management system so that the hypervisors form a virtual computing cloud(s).

Next, the example imaging controller 712 transfers a software image for the VRM to one of hypervisors on the processing units of the example physical rack 102 via the file server 708 and causes the VRM software image to be installed (block 826). After the VRM has been installed, control proceeds to block 838 at which the example DHCP server 710 determines if there are any additional devices to be configured.

Returning to block 818, if the example DHCP server 710 determines that a received DHCP request has been received from a network switch, the example network configuration controller 714 installs an operating system on the network switch (block 828). For example, the network configuration handler 714 may cause the example file server 708 to transfer an operating system from the local repository 704 and may cause the transferred operating system to be installed on the network switch (e.g., via an OOB interface to the network switch). The example network configuration controller 716 then determines if the network switch is a device management switch (block 830). For example, the network configuration controller 714 may determine whether or not the network switch that transmitted a DHCP request is a management switch based on determining that a device identifier, a media access control (MAC) address of the network switch, by a VCI identified in a DHCP request, by a network port to which the network switch is connected to the example virtual imaging appliance 112, etc. is associated with a management switch. When the example network configuration controller 714 determines that the network switch is not a management switch, the example network configuration controller configures the network switch (block 832). For example, if the network switch is a ToR switch, the example network configuration controller 714 may transfer a pre-configured configuration file via the file server 708 to the network switch, may remotely execute commands on the network switch to configure the network switch, etc. Configuration of the network switch may include assigning network addresses to the network switch, configuring the settings for ports of the network switch, creating VLAN(s) on the network switch, configuring a management port on the network switch, etc. For example, the network configuration may be designed to provide one or more virtual local area networks (VLANs) for segregating multiple networks utilized by the components of the physical rack 102 (e.g., a first VLAN for device communication and a second VLAN for OOB management communication). After the network switch has been configured, control proceeds to block 838 at which the example DHCP server 710 determines if there are any additional devices to be configured.

Returning to block 830, if the example network configuration controller 714 determines that the network switch is a management switch, the example network configuration controller configures the network switch (block 834). For example, the example network configuration controller 714 may transfer a pre-configured management switch configuration file via the file server 708 to the network switch, may remotely execute commands on the network switch to configure the network switch, etc. Configuration of the network switch may include assigning network addresses to the network switch, configuring the settings for ports of the network switch, creating VLAN(s) on the network switch, configuring a management port on the network switch, etc. After the network switch has been configured, the example imaging controller 712 transfers a software image for the HMS onto the network switch (block 836). For example, the imaging controller 712 may cause the HMS software image to be installed on the example management switch 208 of the example physical rack 202 of FIG. 2.

After the VRM is installed (block 826) or a network switch has been configured (blocks 832, 836), the example DHCP server 710 determines if all devices have been configured (e.g., have all devices that sent DHCP requests been configured) (block 838). If there are more devices to configure, control returns to block 816 to process the next DHCP request. If all devices have been configured, according to the illustrated example, the example imaging controller 712 then powers on (or reboots) the physical rack 102 to cause the components of the physical rack 102 to begin executing the installed software and configurations (block 840). Once the components of the physical rack 102 have powered on and/or booted, the imaging controller 712 performs testing of the components of the example physical rack 102 (block 842). For example, the imaging controller 712 may execute tests and report the results via a user interface provided by the example user interface controller 718.

FIG. 9 is a block diagram of an example processor platform 900 capable of executing the instructions of FIG. 8 to implement the virtual imaging appliance 112 of FIGS. 1, 4, and/or 7. The processor platform 900 can be, for example, a server, a personal computer, a mobile device (e.g., a cell phone, a smart phone, a tablet such as an iPad™), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache), an executes instructions to implement the example image retriever 706, the example file server 708, the example DHCP server 710, the example imaging controller 712, the example network configuration controller 714, the example storage configuration controller 716, and the example user interface controller 716. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The example mass storage device 928 includes the example configuration database 702 and the example local repository 704.

The coded instructions 932 of (e.g., the coded instructions illustrated by the flowchart of FIG. 8) may be stored in the mass storage device 928, in the volatile memory 914, in the non-volatile memory 916, and/or on a removable tangible computer readable storage medium such as a CD or DVD.

FIGS. 10-15 illustrate example user interfaces that may be presented by the example user interface controller 718 to allow a user to start, control, monitor, etc. the operations of the example virtual imaging appliance 112. The example user interfaces are web pages served by the example user interface controller 718 and accessed using a web browser at a workstation at the example system integrator 104. Alternatively, the user interfaces may be presented as any other type of user interface and may be accessed via any local or remote device.

Figure 10:
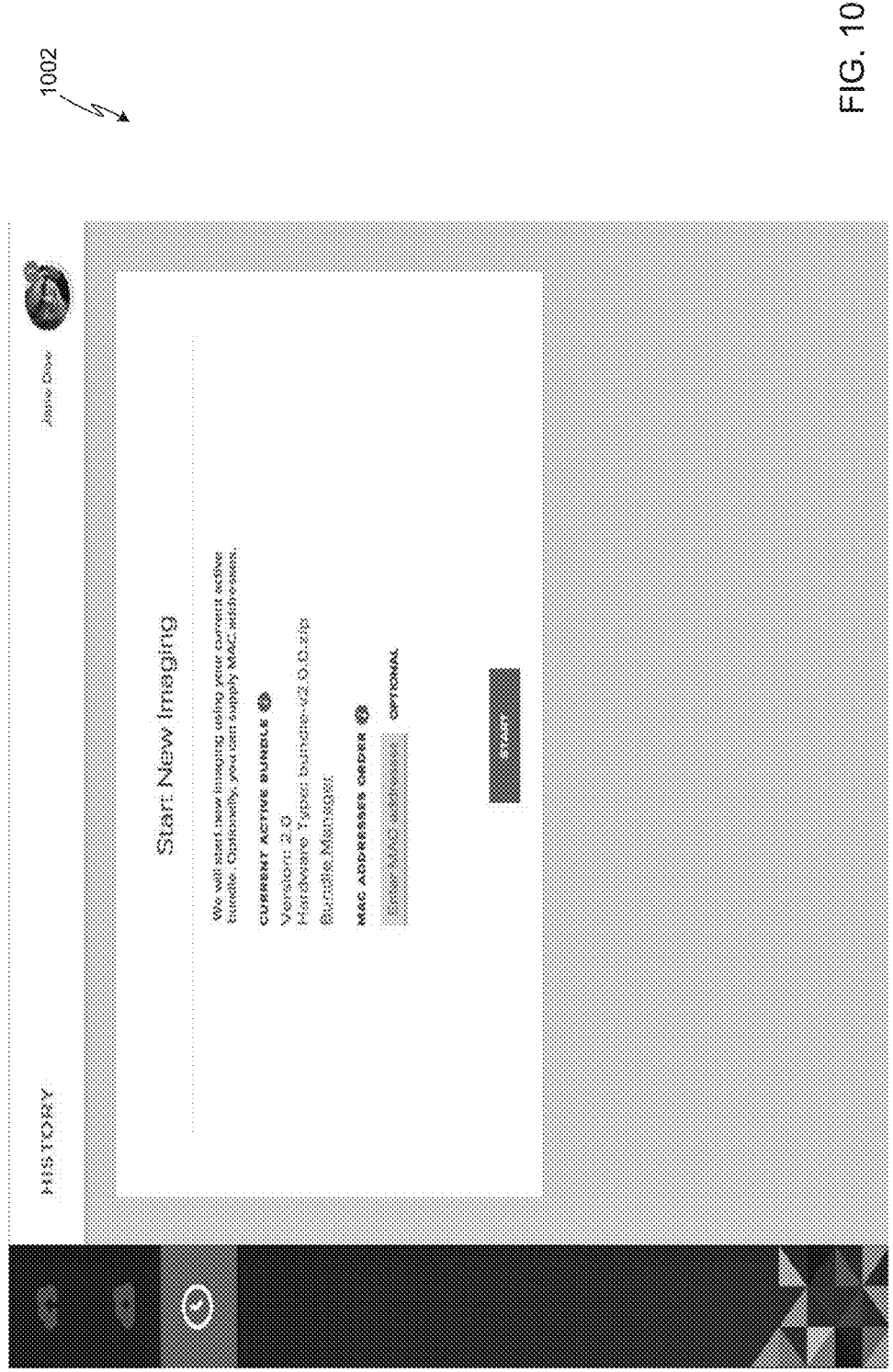
Figure 11:
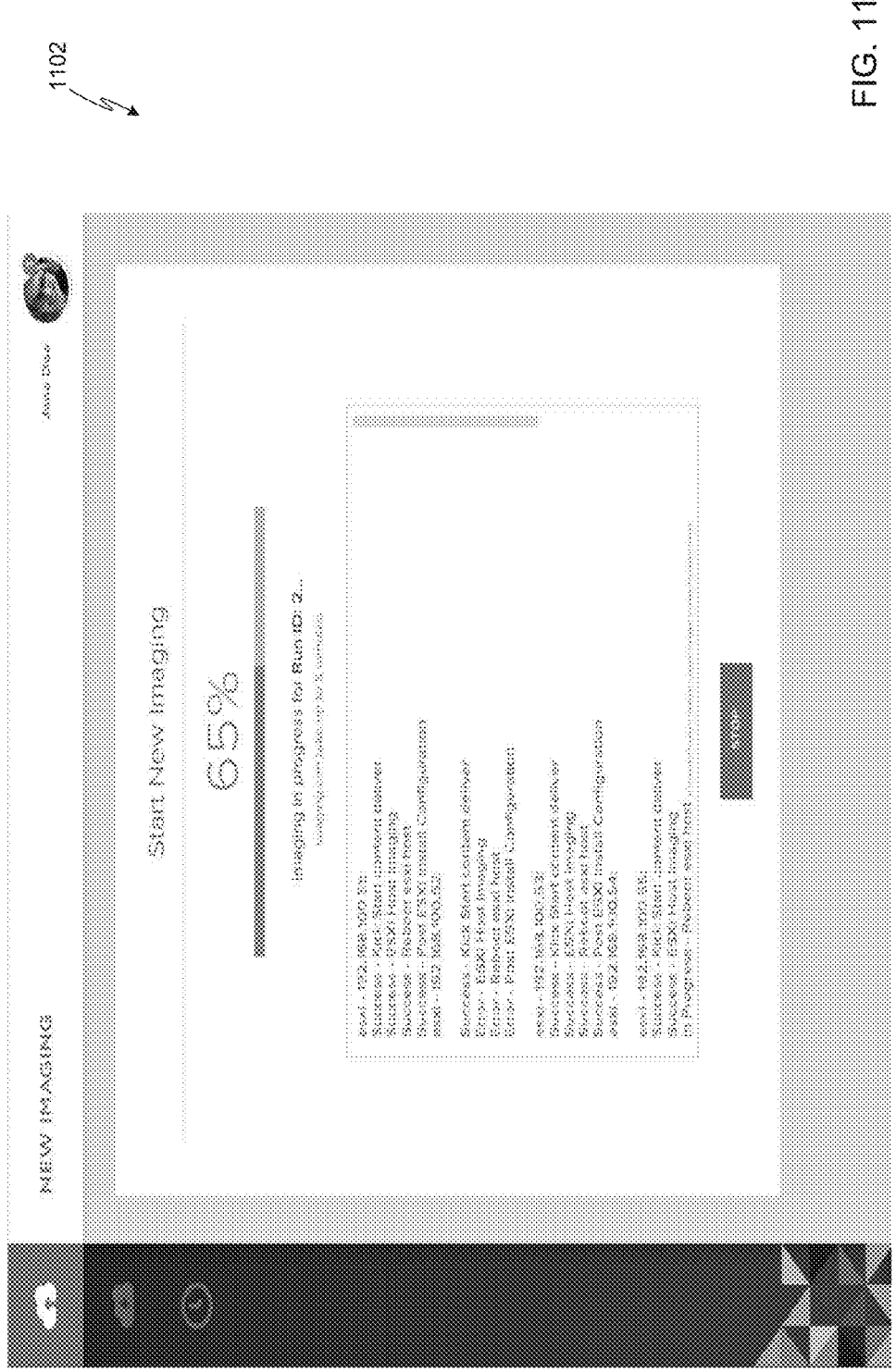

FIG. 10 is an example user interface 1002 that may be presented by the example user interface controller 718 to allow a user to request that that the example virtual imaging appliance 112 initiate imaging of a new physical rack (e.g., the example physical rack 102). When an imaging process has been initiated or continued using the example user interface of FIG. 10, an example user interface 1102 of FIG. 11 may be presented to indicate that imaging is in progress and to present an option for a user to stop the imaging process.

Figure 12:
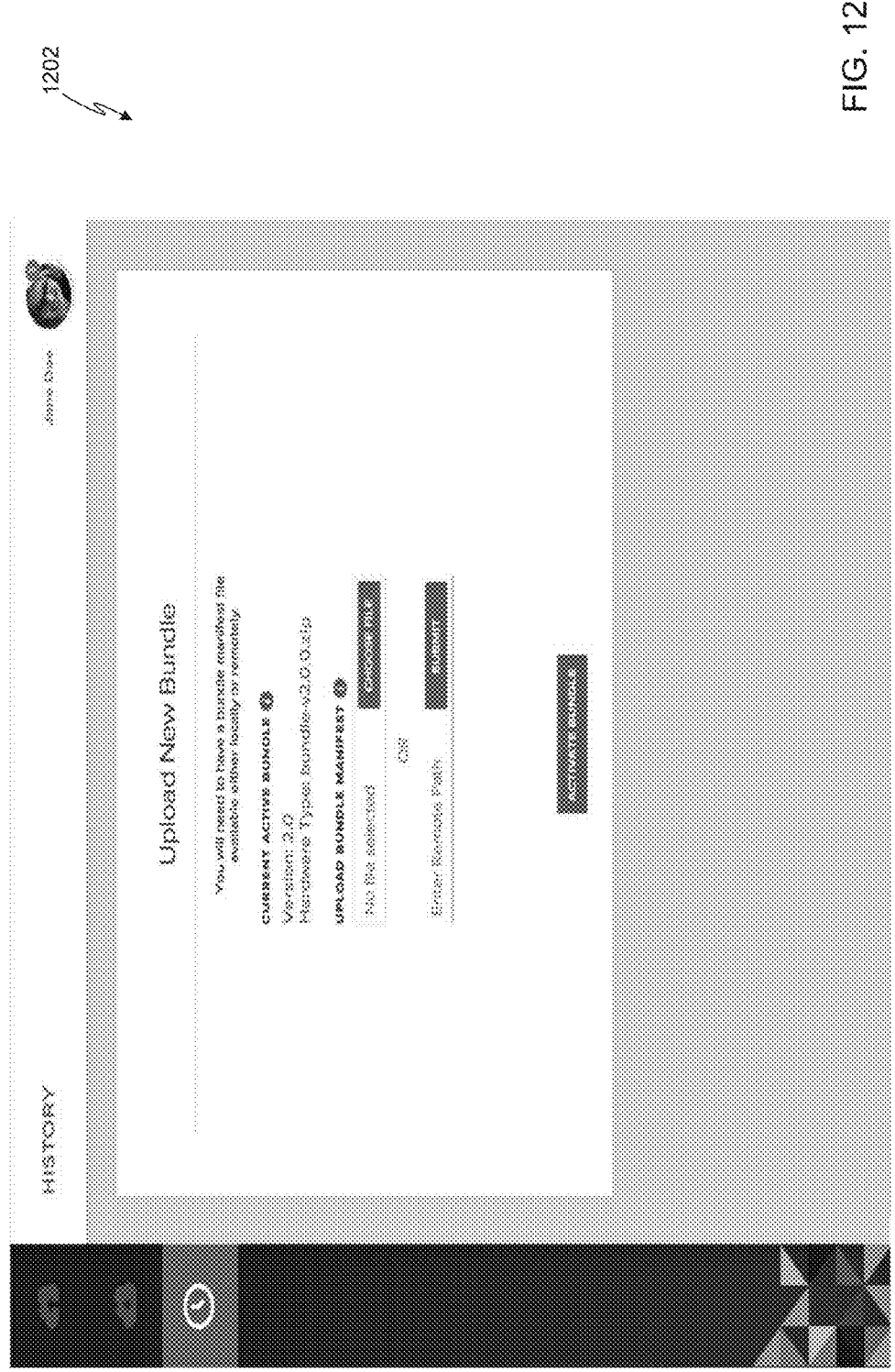
Figure 13:
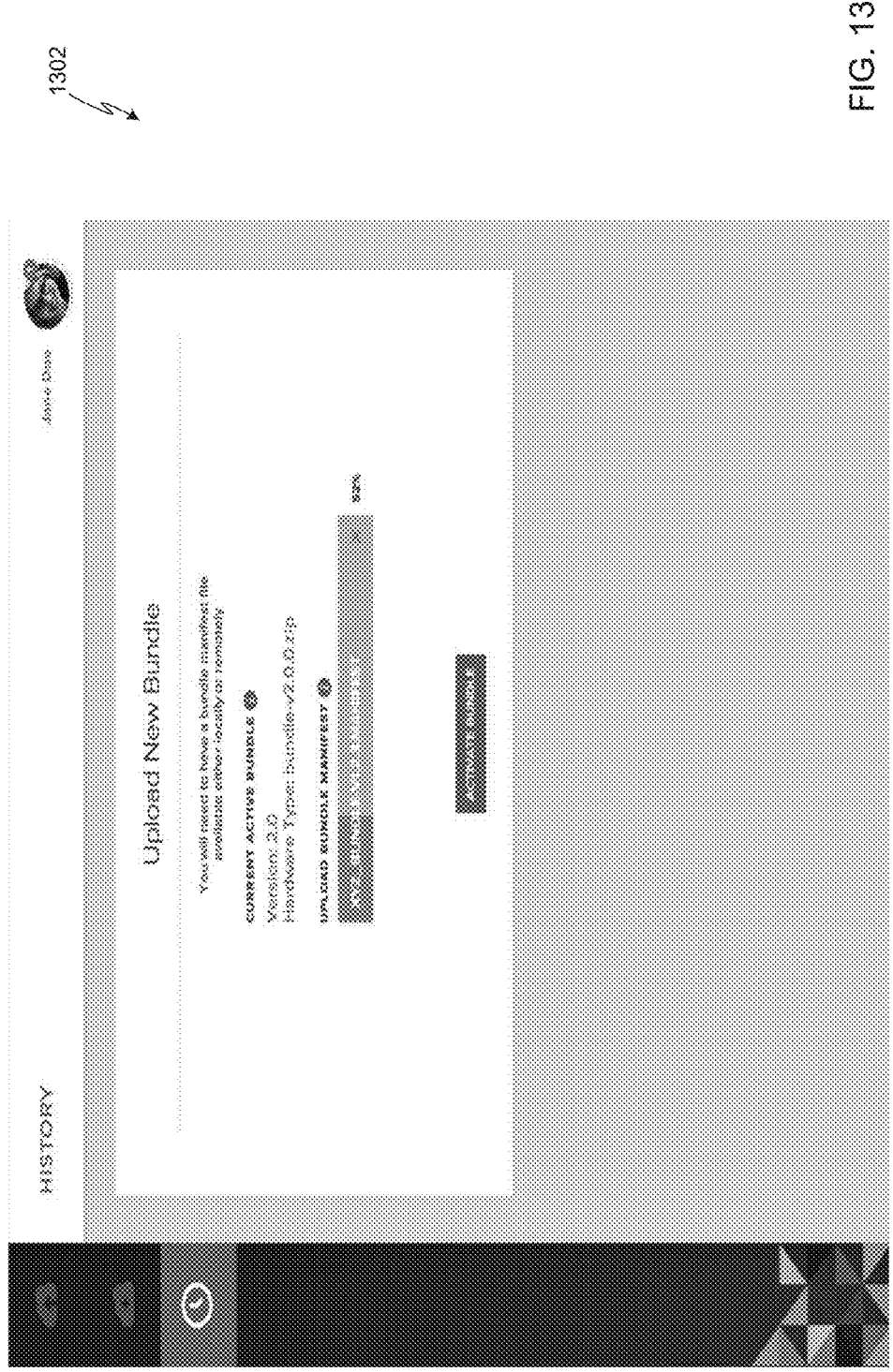
Figure 14:
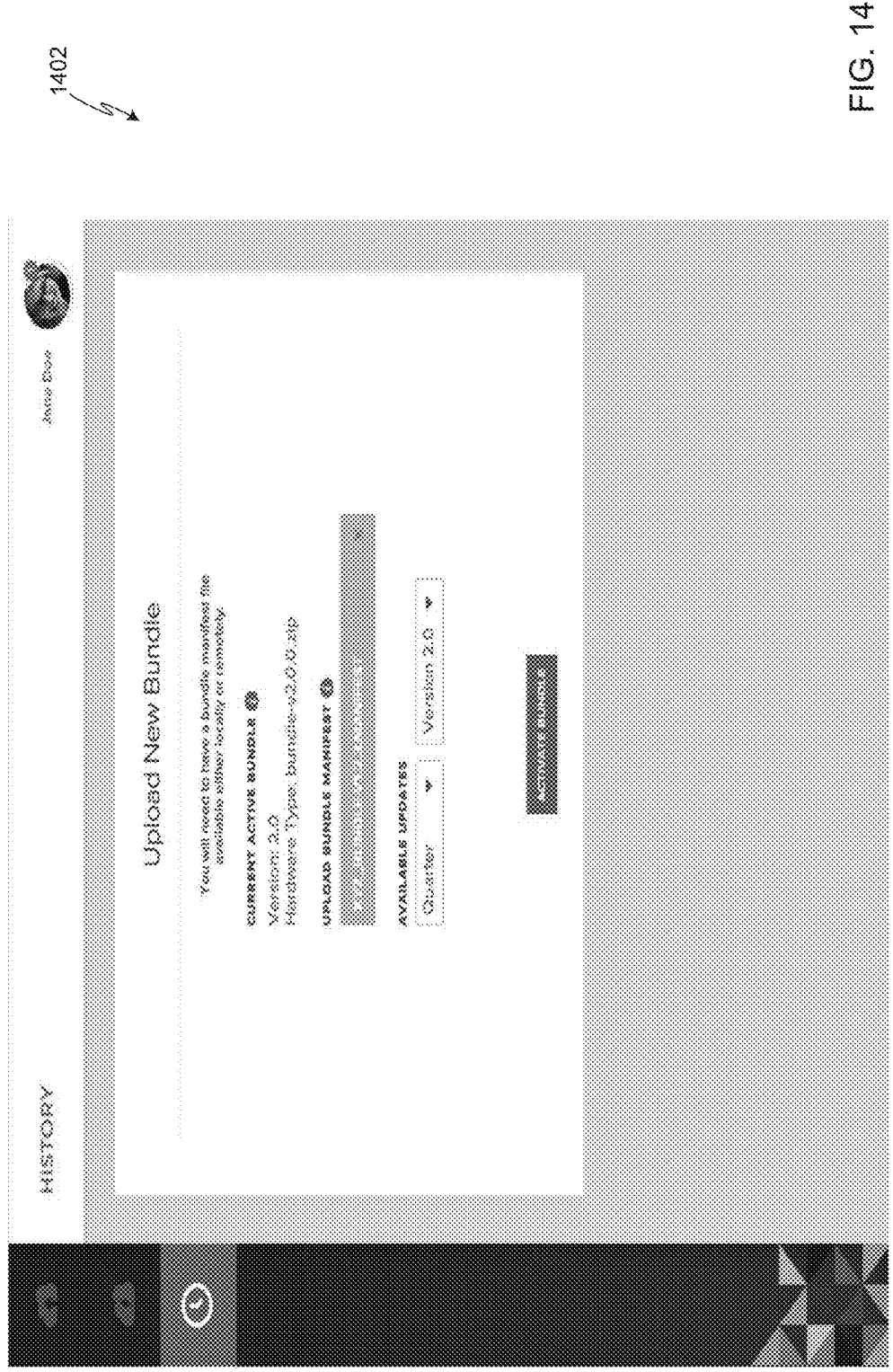

FIG. 12 is an example user interface 1202 that may be presented by the example user interface controller 718 of the example virtual imaging appliance 112 to facilitate uploading a new software/image bundle to the example virtual imaging appliance 112. Once a new bundle is selected for activation, an example user interface 1302 illustrated in FIG. 13 is presented by the example user interface controller 718 to present a status of the retrieval of the bundle (e.g., retrieval from the example virtual system solutions provider 110 of FIG. 1). FIG. 14 illustrates an example user interface 1402 that may be presented by the example user interface controller 718 perform an update of a previously installed software/image bundle.

Figure 15:
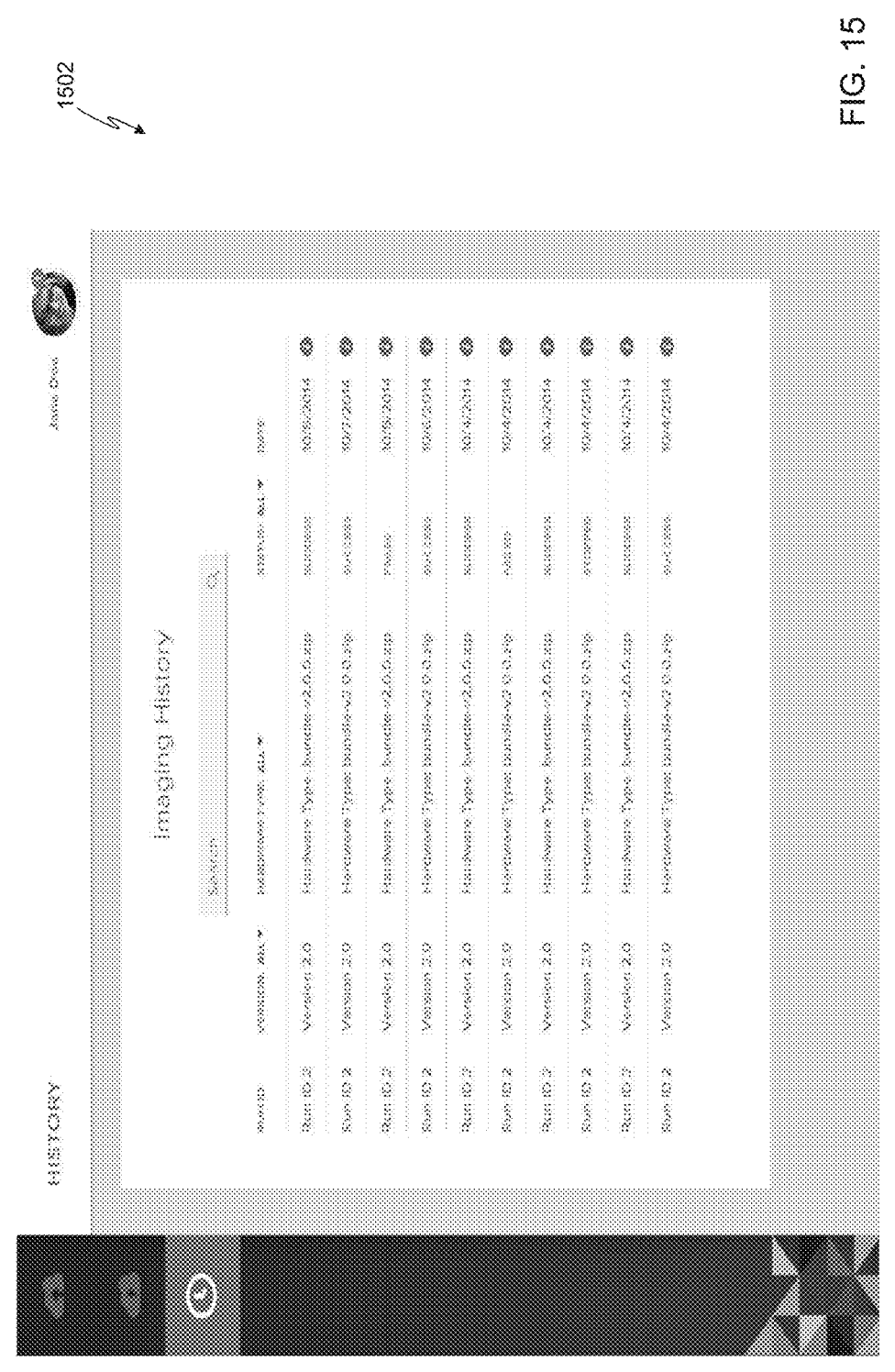

FIG. 15 is an example user interface 1502 that may be presented by the example user interface controller 718 to display a history of imaging operations performed by the example virtual imaging appliance 112.

From the foregoing, it will be appreciated that the above disclosed methods, apparatus and articles of manufacture facilitate the configuration of a physical rack by a system integrator. For example, the example configuring using a virtual imaging appliance may prepare the physical rack so that when the physical rack and powered on by a customer that receives the example physical rack, the customer can quickly (e.g., In less than 2 hours) complete the configuration by providing limited information to prepare the physical rack for use and/or add the physical rack to a cloud, cluster, etc. computing environment in which one or more other physical racks are deployed. In some examples, the virtual imaging appliance automatically retrieves necessary software images for devices detected in a physical rack to reduce the network resource utilization and storage utilization that would be consumed by retrieving multiple sets of software images for hardware resources that may be installed in a physical rack. Additionally, because the software images for the components of the physical rack may be prepared as images that may be installed rather than software installers, the amount of processing resources utilized during the installation is reduced as compared with a system integrator or customer performing individual installations of the various software components of the physical rack.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to configure a server rack, the method comprising:
   in response to receiving, at a virtual imaging appliance deployed by a system integrator, a request to configure a server rack for a customer, retrieving, from a repository that is remote from the system integrator, a software image to be deployed on a processing unit installed in the server rack;
   transmitting the software image from the virtual imaging appliance to the processing unit;
   in response to receiving a dynamic host configuration protocol request from the processing unit at the virtual imaging appliance;
      extracting a vendor class identifier from the dynamic host configuration protocol request;
      detecting the processing unit based on the vendor class identifier; and
      transmitting a network address to the processing unit to be utilized by the processing unit; and
   in response to determining that the vendor class identifier indicates that the processing unit is a management switch, transmitting a hardware management system software image from the virtual imaging appliance to the management switch installed in the server rack to cause a hardware management system to be installed in the server rack.

2. A method as defined in claim 1, wherein the management switch is a first network switch, the method further including transmitting configuration information to a second network switch in the server rack.

3. A method as defined in claim 1, further including transmitting, from the virtual imaging appliance to the processing unit, a hypervisor for execution on the processing unit.

4. A method as defined in claim 1, further including transmitting, from the virtual imaging appliance to at least one of the processing unit or another processing unit in the server rack, a storage driver.

5. A method as defined in claim 1, further including transmitting, from the virtual imaging appliance to at least one of the processing unit or another processing unit in the server rack, a cloud management software image.

6. A method as defined in claim 1, further includes receiving the virtual imaging appliance from a host of the repository.

7. A method as defined in claim 1, wherein the virtual imaging appliance is communicatively coupled to the server rack via at least one of a wide area network or a virtual private network connection.

8. An apparatus for configuring a server rack, the apparatus comprising:
   an image retriever to, in response to receiving at a virtual imaging appliance deployed by a system integrator a request to configure a server rack for a customer, retrieve, from a repository that is remote from the system integrator, a software image to be deployed on a processing unit installed in the server rack;
   a dynamic host configuration protocol (DHCP) server to, in response to receiving a dynamic host configuration protocol request from the processing unit at the virtual imaging appliance, extract a vendor class identifier from the dynamic host configuration protocol request, detect the processing unit based on the vendor class identifier, and transmit a network address to the processing unit to be utilized by the processing unit; and
   a file server to transmit the software image from the virtual imaging appliance to the network address assigned to the processing unit and to, in response to determining that the vendor class identifier indicates that the processing unit is a management switch, transmit a hardware management system software image from the virtual imaging appliance to the management switch installed in the server rack to cause a hardware management system to be installed in the server rack.

9. An apparatus as defined in claim 8, wherein the management switch is a first network switch, the apparatus further including a network configuration controller to transmit configuration information to a second network switch in the server rack.

10. An apparatus as defined in claim 8, wherein the file server is to transmit, from the virtual imaging appliance to the processing unit, a hypervisor for execution on the processing unit.

11. An apparatus as defined in claim 8, further including transmitting, from the virtual imaging appliance to at least one of the processing unit or another processing unit in the server rack, a storage driver.

12. An apparatus as defined in claim 8, further including transmitting, from the virtual imaging appliance to at least one of the processing unit or another processing unit in the server rack, a cloud management software image.

13. An apparatus as defined in claim 8, wherein the virtual imaging appliance is communicatively coupled to the server rack via at least one of a wide area network or a virtual private network connection.

14. A tangible computer readable storage medium comprising instructions that, when executed, cause a machine to at least:
- in response to receiving at a virtual imaging appliance deployed by a system integrator a request to configure a server rack for a customer, retrieve, from a repository that is remote from the system integrator, a software image to be deployed on a processing unit installed in the server rack;
- transmit the software image from the virtual imaging appliance to the processing unit;
- in response to receiving a dynamic host configuration protocol request from the processing unit at the virtual imaging appliance;
   - extract a vendor class identifier from the dynamic host configuration protocol request;
   - detect the processing unit based on the vendor class identifier; and
   - transmit a network address to the processing unit to be utilized by the processing unit; and
- in response to determining that the vendor class identifier indicates that the processing unit is a management switch, transmit a hardware management system software image from the virtual imaging appliance to the management switch installed in the server rack to cause a hardware management system to be installed in the server rack.

15. A tangible computer readable medium as defined in claim 14, wherein the management switch is a first network switch and the instructions, when executed, cause the machine to transmit configuration information to a second network switch in the server rack.

16. A tangible computer readable medium as defined in claim 14, wherein the instructions, when executed, cause the machine to transmit, from the virtual imaging appliance to the processing unit, a hypervisor for execution on the processing unit.

17. A tangible computer readable medium as defined in claim 14, wherein the instructions, when executed, cause the machine to transmit, from the virtual imaging appliance to at least one of the processing unit or another processing unit in the server rack, a storage driver.

18. A tangible computer readable medium as defined in claim 14, wherein the instructions, when executed, cause the machine to transmit, from the virtual imaging appliance to at least one of the processing unit or another processing unit in the server rack, a cloud management software image.

19. A tangible computer readable medium as defined in claim 14, wherein the instructions, when executed, further cause the machine to receive the virtual imaging appliance from a host of the repository.

20. A tangible computer readable medium as defined in claim 14, wherein the virtual imaging appliance is communicatively coupled to the server rack via at least one of a wide area network or a virtual private network connection.

* * * * *